(12) United States Patent
Li et al.

(10) Patent No.: US 11,412,539 B2
(45) Date of Patent: Aug. 9, 2022

(54) SIGNALING OF MULTIPLE SHORT TTI TRANSMISSIONS

(71) Applicant: TELEFONAKTIEBOLAGET LM ERICSSON (PUBL), Stockholm (SE)

(72) Inventors: Jingya Li, Gothenburg (SE); Laetitia Falconetti, Järfälla (SE); Henrik Sahlin, Mölnlycke (SE); John Camilo Solano Arenas, Dusseldorf (DE); Reem Karaki, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 196 days.

(21) Appl. No.: 16/495,723

(22) PCT Filed: Mar. 26, 2018

(86) PCT No.: PCT/SE2018/050318
§ 371 (c)(1),
(2) Date: Sep. 19, 2019

(87) PCT Pub. No.: WO2018/203788
PCT Pub. Date: Nov. 8, 2018

(65) Prior Publication Data
US 2020/0100278 A1 Mar. 26, 2020

Related U.S. Application Data

(60) Provisional application No. 62/502,089, filed on May 5, 2017.

(51) Int. Cl.
*H04W 72/14* (2009.01)
*H04L 5/00* (2006.01)
*H04W 72/04* (2009.01)

(52) U.S. Cl.
CPC ........... *H04W 72/14* (2013.01); *H04L 5/0048* (2013.01); *H04L 5/0051* (2013.01);
(Continued)

(58) Field of Classification Search
CPC ............... H04W 72/14; H04W 72/042; H04W 72/0446; H04L 5/0048; H04L 5/0007; H04L 5/0094; H04L 5/0053; H04L 5/0082
See application file for complete search history.

(56) References Cited

U.S. PATENT DOCUMENTS 10,841,907 B2 * 11/2020 Gao ................ H04L 5/0051
2017/0171842 A1 * 6/2017 You ................ H04L 5/0023
(Continued)

FOREIGN PATENT DOCUMENTS

| CN | 106535352 A | 3/2017 |
| EP | 3327975 A1 | 5/2018 |
| KR | 10-2015-0143575 A | 12/2015 |
| KR | 10-2017-0117135 A | 10/2017 |
| KR | 10-2018-0074750 A | 7/2018 |
| WO | 2017018758 A1 | 2/2017 |

OTHER PUBLICATIONS

Huawei et al., Discussion on sPDCCH design, RI-1704264, 3GPP TSG RAN WG1 Meeting #88b, Apr. 3-7, 2017, Spokane, USA, 16 pages,.
(Continued)

*Primary Examiner* — Nishant Divecha

(57) ABSTRACT

Systems and methods are described herein for scheduling multiple short Transmission Time Internal (sTTI) transmissions. In some embodiments, a method of operation of a network node of a wireless communication network for scheduling multiple sTTI transmissions comprises transmitting a control information message to a wireless device for two or more sTTI transmissions, wherein the control information message comprises scheduling information indicating two or more scheduled sTTIs for the two or more sTTI
(Continued)

transmissions, respectively, and/or an indication of a timing for the two or more scheduled sTTIs for the two or more sTTI transmissions and/or an indication of a Demodulation Reference Signal (DMRS) configuration for the two or more scheduled sTTIs for the two or more sTTI transmissions. By using multi-sTTI scheduling, control signaling overhead is reduced.

23 Claims, 12 Drawing Sheets

(52) U.S. Cl.
CPC .......... *H04L 5/0053* (2013.01); *H04L 5/0082* (2013.01); *H04L 5/0094* (2013.01); *H04W 72/042* (2013.01); *H04L 5/0007* (2013.01); *H04W 72/0446* (2013.01)

(56) References Cited

U.S. PATENT DOCUMENTS

| | | | |
|---|---|---|---|
| 2018/0049175 A1* | 2/2018 | Bagheri | H04L 5/0048 |
| 2018/0077658 A1* | 3/2018 | Nory | H04L 5/0055 |
| 2018/0131490 A1* | 5/2018 | Patel | H04W 72/042 |
| 2018/0279296 A1* | 9/2018 | Hosseini | H04L 5/0053 |
| 2019/0098608 A1* | 3/2019 | Yi | H04L 27/26 |
| 2019/0116005 A1* | 4/2019 | Harada | H04L 1/1671 |
| 2019/0116592 A1* | 4/2019 | Moon | H04W 72/042 |

OTHER PUBLICATIONS

Nokia et al., On scheduling of sPDSCH and sPUSCH, R1-1704805, 3GPP TSG-RAN WG1 Meeting #88b, Apr. 3-7, 2017, Spokane, U.S.A, 10 pages.
ISR and Written opinion from corresponding application PCT/SE2018/050318.
GPP TS 36.212, V14.2.0, 3rd Generation Partnership Project; Technical Specification Group Radio Access Network; Evolved Universal Terrestrial Radio Access (E-UTRA); Multiplexing and channel coding, Release 14, Mar. 2017, 197 pages.
3GPP TR 36.881, V14.0.0, 3rd Generation Partnership Project; Technical Specification Group Radio Access Network; Evolved Universal Terrestrial Radio Access (E-UTRA); Study on latency reduction techniques for LTE, Release 14, Jun. 2016, 99 pages.
3GPP TR 36.881, V14.0.0, Annex B, System evaluation results, Jun. 2016, 9 pages.
3GPP TR 36.881, V14.0.0, Annex C, Link-level evaluation results, Jun. 2016, 62 pages.
Ericsson, Revised Work Item on shortened TTI and processing time for LTE, RP-162014, 3GPP TSG RAN Meeting #74, Dec. 5-8, 2016, Vienna, Austria, 9 pages.
CMCC, Discussion on DMRS sharing for uplink sTTI transmission, 3GPP TSG RAN WG1 Meeting #88b, R1-1705108, Spokane, USA, Apr. 3-7, 2017, 3 pages.
Huawei, Hisilicon, Discussion on sTTI scheduling, 3GPP TSG RAN WG1 Meeting #88bis, R1-1704263, Spokane, USA, Apr. 3-7, 2017, 8 pages.
Nokia, Alcatel-Lucent Shanghai Bell, On DL subframe structure for 2OS shortened TTI, 3GPP TSG-RAN WG1 Meeting #87, R1-1612213, Reno, Nevada, U.S.A , Nov. 14-18, 2016, 5 pages.
Catt, On sDCI design, 3GPP TSG RAN WG1 Meeting #88, R1-1702048, Athens, Greece Feb. 13-17, 2017.
Ericsson, HARQ process handling with different TTIs lengths, 3GPP TSG-RAN WG2 #97, R2-1701607, Athens, Greece, Feb. 13-17, 2017.
Ericsson, Reduced processing time but with 1ms TTI length, 3GPP TSG-RAN WG2 #97, R2-1701605, Athens, Greece, Feb. 13-17, 2017.
Sharp, Association timing for sTTI with different UL and DL lengths, 3GPP TSG RAN WG1 Meeting #87, R1-1612618, Reno, USA Nov. 14-18, 2016.

* cited by examiner

*LTE time-domain structure*

*LTE downlink physical resource*

*LTE uplink resource grid*

Downlink subframe

*An example of a 7 symbol sTTI configuration within an uplink subframe*

*An example of a 2/3 symbol sTTI configuration within an uplink subframe*

*An example of a 2/3 symbol sTTI configuration within an uplink subframe with DMRS multiplexing*

*An example of a 2/3 symbol sTTI configuration within an uplink subframe with DMRS sharing*

*Examples of a 2/3 symbol sTTI configuration within a downlink subframe*

An illustration of n+6 uplink scheduling timing for 2/3 symbol sTTI configurations in both UL and DL. sDCI can be transmitted in each DL sTTI An example of using 1 bit in the sDCI for indicating the DMRS configuration of the scheduled multiple uplink sTTIs

FIG. 14

An example of n+6 uplink scheduling timing for 2/3 symbol sTTI configurations in both UL and DL. sDCI for multi-sTTI scheduling can only be transmitted from PDCCH

FIG. 15

An example of n+4 uplink scheduling timing for 2/3 symbol sTTI configurations in both UL and DL. Multi-sTTI DCI can only be transmitted from PDCCH

SIGNALING OF MULTIPLE SHORT TTI TRANSMISSIONS

RELATED APPLICATIONS

This application is a 35 U.S.C. § 371 national phase filing of International Application No. PCT/SE2018/050318, filed Mar. 26, 2018, which claims priority of US provisional patent application 62/502,089 filed May 5, 2017, the content of both of which is incorporated herein by reference in its entirety.

TECHNICAL FIELD

The present disclosure relates to scheduling short transmission time interval transmissions in a wireless communications network.

BACKGROUND

I. Long Term Evolution (LTE) Frame Structure and Physical Channels for 1 Millisecond (Ms) Transmission Time Interval (TTI)

In Third Generation Partnership Project (3GPP) LTE systems, data transmissions in both downlink (i.e., from a network node or enhanced or evolved Node B (eNB) to a user device or User Equipment device (UE)) and uplink (from a user device or UE to a network node or eNB) are organized into radio frames of 10 milliseconds (ms), each radio frame consisting of ten equally-sized subframes of length $T_{subframe}=1$ ms, as shown in FIG. 1.

LTE uses Orthogonal Frequency Division Multiplexing (OFDM) in the downlink and Single Carrier OFDM (SC-OFDM) in the uplink. The basic LTE downlink physical resource can thus be seen as a time-frequency grid as illustrated in FIG. 2, where each resource element corresponds to one OFDM subcarrier during one OFDM symbol interval.

Furthermore, the resource allocation in LTE is typically described in terms of Resource Blocks (RBs), where a RB corresponds to one slot (0.5 ms) in the time domain and 12 contiguous subcarriers in the frequency domain. RBs are numbered in the frequency domain, starting with 0 from one end of the system bandwidth.

Similarly, the LTE uplink resource grid is illustrated in FIG. 3, where $N_{RB}^{UL}$ is the number of RBs contained in the uplink system bandwidth, $N_{sc}^{RB}$ is the number subcarriers in each RB, typically $N_{sc}^{RB}=12$, and $N_{symb}^{UL}$ is the number of SC-OFDM symbols in each slot. $N_{symb}^{UL}=7$ for normal Cyclic Prefix (CP) and $N_{symb}^{UL}=6$ for extended CP. A subcarrier and a SC-OFDM symbol form an uplink Resource Element (RE).

Downlink data transmissions from an eNB to a UE are dynamically scheduled, i.e., in each subframe the base station transmits control information about to which terminals data is transmitted and upon which RBs the data is transmitted, in the current downlink subframe or the downlink part (DwPTS) of the current special subframe. This control signaling is typically transmitted in the first 1, 2, 3, or 4 OFDM symbols in each subframe. A downlink subframe with three OFDM symbols as control is illustrated in FIG. 4.

Similar to downlink, uplink transmissions from a UE to an eNB are also dynamically scheduled through the downlink control channel. When a UE receives an uplink grant in subframe n, it transmits data in the uplink at subframe n+k, where k=4 for a Frequency Division Duplexing (FDD) system and k varies for Time Division Duplexing (TDD) systems.

In LTE, several physical channels and signals are supported for transmission of control information and data payloads. Some of the downlink physical channels and signals supported in LTE are:
  Physical Downlink Shared Channel (PDSCH)
  Physical Downlink Control Channel (PDCCH)
  Enhanced PDCCH (ePDCCH)
  Reference signals:
    Cell Specific Reference Signals (CRSs)
    Demodulation Reference Signal (DMRS) for PDSCH
    Channel State Information Reference Signals (CSI-RSs)

PDSCH is used mainly for carrying user traffic data and higher layer messages in the downlink and is transmitted in a downlink subframe outside of the control region as shown in FIG. 4. Both PDCCH and ePDCCH are used to carry Downlink Control Information (DCI) such as Physical RB (PRB) allocation, Modulation and Coding Scheme (MCS), precoder used at the transmitter, etc.

Existing physical layer downlink control channels, PDCCH and ePDCCH, are transmitted once per 1 ms subframe. Furthermore, a PDCCH is distributed over the whole carrier bandwidth, but is time multiplexed with PDSCH over the first 1-4 symbols in the subframe. An ePDCCH is distributed over the whole 1 ms subframe, but is frequency multiplexed with PDSCH and multiplexed onto one or multiple PRB pairs for localized and distributed transmission respectively. PDCCH has a common search space where all UEs need to detect common cell specific control information. Depending whether the UE has been configured for ePDCCH or not, it searches UE specific control information from UE search space of ePDCCH or PDCCH, respectively.

It is also noted that the size of the PDCCH region can change dynamically on subframe basis. Recall that the size of the PDCCH region is signaled on the Physical Control Format Indicator Channel (PCFICH) in the beginning of the 1 ms subframe. The frequency domain allocation of the ePDCCH is semi-statically configured by means of higher layer signaling.

Some of the uplink physical channels and signals supported in LTE are:
  Physical Uplink Shared Channel (PUSCH)
  Physical Uplink Control Channel (PUCCH)
  DMRS for PUSCH
  DMRS for PUCCH The PUSCH is used to carry uplink data or/and uplink control information from the UE to the eNB. The PUCCH is used to carry uplink control information from the UE to the eNB.

II. DCI Formats for 1 ms TTI Scheduling

The current control channels carry control information, referred to as DCI. There are several DCI formats which have different options depending on, e.g., configured transmission mode. The DCI format has a Cyclic Redundancy Check (CRC) which is scrambled by a UE identifier, such as a Cell Radio Network Temporary Identifier (C-RNTI), and when the CRCs match, after descrambling, a PDCCH with a certain DCI format has been detected. There are also identifiers that are shared by multiple terminals, such as the System Information Radio Network Temporary Identifier (SI-RNTI) which is used for transmission of system information.

a. DCI Formats for Downlink Scheduling Assignments

There are currently a number of different DCI formats, see 3GPP Technical Specification (TS) 36.212 for downlink resource assignments including formats 1, 1A, 1B, 1C, 1D, 2, 2A, 2B, 2C, and 2D.

Format 1: single codeword transmission
  1 bit for indicating resource allocation type (type 0 or type 1)
  $\lceil N_{RB}^{DL}/P \rceil$ bits for the resource allocation (type 0 or type 1)
  3 bits for Hybrid Automatic Repeat Request (HARQ) process number (4 bits for TDD)
  3 bits for New Data Indicator (NDI) and Redundancy Version (RV)
  5 bits for MCS Format 1A, 1B, 1D
  $\lceil \log_2(N_{RB}^{DL}(N_{RB}^{DL}+1)/2) \rceil$ bits for the resource allocation (type 2)
  3 bits for HARQ process number (4 bits for TDD)
  3 bits for NDI and RV
  5 bits for MCS Format 2, 2A, 2B, 2C, 2D: two codeword transmission
  $\lceil N_{RB}^{DL}/P \rceil$ bits for the resource allocation (type 0 or type 1)
  3 bits for HARQ process number (4 bits for TDD)
  2×3 bits for NDI and RV
  2×5 bits for MCS Here, P is the RB group size which depends on the system bandwidth and $N_{RB}^{DL}$ is the number of RBs in the downlink.

The DCI for a downlink scheduling assignment hence contains information on downlink data resource allocation in the frequency domain (the resource allocation), MCS, and HARQ process information. In case of carrier aggregation, information related to which carrier the PDSCH is transmitted on may be included as well.

b. DCI Formats for Uplink Scheduling Grants

There are two main families of DCI formats for uplink grants, DCI format 0 and DCI format 4. The latter is added in Release 10 for supporting uplink spatial multiplexing. Several DCI format variants exist for both DCI format 0 and DCI format 4 for various purposes, e.g. scheduling in unlicensed spectrum.

In general, the DCI for an uplink scheduling grant contains:
Resource allocation information
  Carrier indicator
  Resource allocation type
  RB allocation
RS and data related information
  MCS
  NDI
  Cyclic shift of the uplink DMRS
  Precoding information
  Transmit power control
Other information
  Sounding Reference Signal (SRS) request
  Channel State Information (CSI) request
  Uplink index (for TDD)
  DCI format 0/1A indication (only in DCI format 0 and 1A)
  Padding
  CRC scrambled with Radio Network Temporary Identifier (RNTI) of the terminal III. Latency Reduction with Short TTI (sTTI)

Packet data latency is one of the performance metrics that vendors, operators, and also end-users (via speed test applications) measure regularly. Latency measurements are done in all phases of a radio access network system lifetime, when verifying a new software release or system component, when deploying a system, and when the system is in commercial operation.

Shorter latency than previous generations of 3GPP Radio Access Technologies (RATs) was one performance metric that guided the design of LTE. The end-users also now recognize LTE to be a system that provides faster access to the Internet and lower data latencies than previous generations of mobile radio technologies.

Packet data latency is important not only for the perceived responsiveness of the system; it is also a parameter that indirectly influences the throughput of the system. Hypertext Transfer Protocol (HTTP)/Transmission Control Protocol (TCP) is the dominating application and transport layer protocol suite used on the Internet today. According to HTTP Archive (http://httparchive.org/trends.php), the typical size of HTTP based transactions over the Internet are in the range of a few tens of kilobytes up to one megabyte. In this size range, the TCP slow start period is a significant part of the total transport period of the packet stream. During TCP slow start the performance is latency limited. Hence, improved latency can rather easily be showed to improve the average throughput for this type of TCP based data transactions.

Latency reductions could positively impact radio resource efficiency. Lower packet data latency could increase the number of transmissions possible within a certain delay bound; hence higher Block Error Rate (BLER) targets could be used for the data transmissions freeing up radio resources potentially improving the capacity of the system.

One approach to latency reduction is the reduction of transport time of data and control signaling by addressing the length of a TTI. By reducing the length of a TTI and maintaining the bandwidth, the processing time at the transmitter and the receiver nodes is also expected to be reduced, due to less data to process within the TTI. In LTE Release 8, a TTI corresponds to one subframe of length 1 ms. One such 1 ms TTI is constructed by using 14 OFDM or Single Carrier-Frequency Division Multiple Access (SC-FDMA) symbols in the case of normal CP and 12 OFDM or SC-FDMA symbols in the case of extended CP. In LTE Release 14, a study item on latency reduction has been conducted, with the goal of specifying transmissions with shorter TTIs, such as a slot or a few symbols [3GPP TR 36.881]. A work item with the goal of specifying sTTI started in August 2016 [3GPP RP-162014].

a. Reduced Processing Time for Shorter TTI

In LTE, a minimum required processing time is specified and applied for the downlink HARQ feedback timing and the uplink grant to uplink data delay. The latter is also called uplink scheduling timing. In case of sTTI, the minimum processing time will be reduced. For 2 OFDM symbol (2os) TTI, the minimum required processing timing could be k=1 sTTI, resulting in a timing of n+k. An example is k=6 sTTI. This means that a UE receiving a downlink assignment for a downlink sTTI received in downlink sTTI n is expected to transmit the downlink HARQ feedback in uplink sTTI n+k. The same can be applied for the uplink scheduling timing. A UE receiving an uplink grant for an uplink sTTI in downlink sTTI n is expected to transmit the uplink data in uplink sTTI n+k.

In TDD, the sTTI n+k may not be a valid uplink sTTI, in which case special rules for the timing can be defined but the minimum processing timing cannot be earlier than n+k. Similarly, in case of different downlink and uplink TTI lengths (for instance 2os TTI in downlink and slot TTI in uplink), the timing n+k may not always correspond to a valid sTTI in uplink, in which case special rules can be defined, such as HARQ feedback or uplink data should be sent in the earliest uplink sTTI after n+k.

b. sTTI Configuration in a Subframe

An sTTI can be decided to have any duration in time and comprise resources on a number of OFDM or SC-FDMA symbols within a 1 ms subframe. As one example shown in FIG. 5, the duration of the uplink sTTI is 0.5 ms, i.e. seven SC-FDMA symbols for the case with normal CP. As another example shown in FIG. 6, the durations of the uplink sTTIs within a subframe are of 2 or 3 symbols. Here, the "R" in the figures indicates the DMRS symbols, and "S" indicates the SRS symbols.

For uplink sTTI transmissions, shorter TTI lengths lead to larger DMRS overhead assuming at least one SC-FDMA symbol for transmitting DMRS within each sTTI for channel estimation. For very short TTI lengths, e.g. 2-symbol sTTI, the DMRS overhead can be 50%, leading to a significant performance loss in terms of throughput and spectral efficiency. In LTE, different DMRS design options have been considered to reduce the DMRS overhead:

DMRS multiplexing: In case different UEs are scheduled in consecutive sTTIs, multiple UEs share the same SC-FMDA symbol for transmitting DMRS sequences, but having separate SC-FMDA symbols for the data.

DMRS sharing: When the same UE is scheduled on consecutive sTTIs, the DMRS is not transmitted in each sTTI. Instead, the DMRS transmitted in the first sTTI will be shared by the following scheduled sTTIs for channel estimation.

Example mechanisms depicted in FIG. 7 and FIG. 8 would work both for DMRS sharing and DMRS multiplexing. For DMRS multiplexing, consider the example of UE 1 scheduled in sTTI 0 and UE 2 in sTTI 1. In FIG. 7, UE 1 will transmit data in SC-FDMA symbols 0 and 1 and DMRS in symbol 2. UE 2 will transmit DMRS in the same symbol and data in symbols 3 and 4. If the mechanism depicted in FIG. 8 is used, UE 1 will transmit DMRS in symbol 0 and data in symbols 1 and 2. UE 2 will transmit DMRS in symbol 0, be silent in symbols 1 and 2, and send data in symbols 3 and 4.

In case of DMRS sharing, UE 1 is scheduled in both sTTI 0 and sTTI 1. In FIG. 7, UE 1 transmits data in symbols 0, 1, 3, and 4 and DMRS in symbol 2. In FIG. 8, UE 1 transmits data in symbols 1, 2, 3, and 4 and DMRS in symbol 0.

FIG. 9 shows examples for 2 or 3-symbol downlink sTTI configurations within a subframe. Downlink transmissions can be CRS based or DMRS based. For DMRS based transmissions, the DMRS sharing option, as explained for uplink, can also be used for downlink sTTI transmissions to reduce the DMRS overhead.

Throughout this disclosure, short PDSCH (sPDSCH) and short PUSCH (sPUSCH) to denote the downlink and uplink physical shared channels with sTTIs, respectively. Similarly, short PDCCH (sPDCCH) is used to denote downlink physical control channels with sTTIs.

c. Downlink and Uplink sTTI Scheduling

To schedule an uplink or a downlink sTTI transmission, it is possible for the eNB to transmit the corresponding control information by using a new DCI format, referred to as short DCI (sDCI), in each downlink sTTI. The control channel carrying this sDCI can be either PDCCH or sPDCCH.

SUMMARY

Systems and methods are described herein for scheduling multiple short Transmit Time Internal (sTTI) transmissions.

In some embodiments, a method of operation of a network node of a wireless communication network for scheduling multiple sTTI transmissions comprises transmitting a control information message to a wireless device for two or more sTTI transmissions, wherein the control information message comprises scheduling information indicating two or more scheduled sTTIs for the two or more scheduled sTTI transmissions, respectively, and/or an indication of a timing for the two or more scheduled sTTIs for the two or more scheduled sTTI transmissions and/or an indication of a DMRS configuration for the two or more scheduled sTTIs for the two or more scheduled sTTI transmissions. By using multi-sTTI scheduling, control signaling overhead is reduced.

In some embodiments, the two or more sTTI transmissions comprise two or more uplink sTTI transmissions. In some other embodiments, the two or more sTTI transmissions comprise two or more downlink sTTI transmissions.

In some embodiments, the two or more scheduled sTTIs are consecutive in the time domain.

In some embodiments, the control information message is transmitted on a physical downlink control channel. In some other embodiments, the control information message is transmitted on a short physical downlink control channel used for scheduling sTTI transmissions. In some other embodiments, the control information message can be transmitted on either a physical downlink control channel or a short physical downlink control channel used for scheduling both uplink and downlink sTTI transmissions. In some embodiments, a short physical downlink control channel can be transmitted in each downlink sTTI, except for a legacy control region.

In some embodiments, the control information message comprises a bit field that indicates the number of scheduled sTTIs. In some embodiments, the two or more scheduled sTTIs are determined by a fixed scheduling timing and the bit field of the control information message that indicates the number of scheduled sTTIs. In some embodiments, a plurality of possible combinations of two or more sTTI transmissions are predefined, and the bit field comprised in the control information message together with an index of a downlink sTTI containing the control message explicitly indicates one of the plurality of possible combinations of two or more sTTI transmissions as a selected combination of sTTIs for the sTTI transmissions. Further, in some embodiments, the control information message is comprised in a short physical downlink control channel. In some other embodiments, a plurality of possible combinations of two or more sTTI transmissions are predefined, and the bit field comprised in the control information message explicitly indicates one of the plurality of possible combinations of two or more sTTI transmissions as a selected combination of sTTIs for the sTTI transmissions. Further, in some embodiments, the control information message is comprised in a physical downlink control channel for a TTI that comprises a plurality of sTTIs.

In some embodiments, a DMRS configuration for each of the plurality of possible combinations of two or more sTTI transmissions is preconfigured. In some other embodiments, the control information comprises a second bit field that indicates a DMRS configuration for the two or more scheduled sTTI transmissions. In some other embodiments, the control information comprises a second bit field that, together with the number of scheduled sTTIs, indicates a DMRS configuration for the two or more scheduled sTTI transmissions. In some embodiments, the DRMS configuration comprises a number of DMRS symbols and/or DMRS symbol positions for the two or more scheduled sTTIs.

In some embodiments, the control information message comprises a first bit field that indicates the number of scheduled sTTIs and a second bit field that indicates a timing of at least a first scheduled sTTI of the two or more sTTIs, and the two or more scheduled sTTIs are determined by the first bit field of the control information message that indicates the number of scheduled sTTIs and the second bit field of the control information message that indicates the timing of at least the first scheduled sTTI.

In some embodiments, the scheduling information is slot-based multi-sTTI scheduling information that schedules all sTTIs in one or more slots as the two or more scheduled sTTIs. In some embodiments, transmission of the control information message is limited to PDCCH. In some embodiments, transmission of the control information message is limited to PDCCH and a first sTTI in a second slot of the subframe.

In some embodiments, a DMRS configuration, including both a number of DMRS symbols and DMRS symbol positions, is preconfigured or configured by signaling, for each of a plurality of possible combinations of two or more scheduled sTTIs.

In some embodiments, a DMRS configuration for the scheduled sTTIs, including both a number of DMRS symbols and DMRS symbol positions, is determined by a separate bit field of the control information message.

Embodiments of a network node are also disclosed. In some embodiments, a network node for a wireless communication network for scheduling multiple sTTI transmissions is adapted to perform the method of any one of the embodiments of a method of operation of a network node described herein.

In some embodiments, a network node for a wireless communication network for scheduling multiple sTTI transmissions comprises at least one processor and memory storing instructions executable by the at least one processor whereby the network node is operable to perform the method of any one of the embodiments of a method of operation of a network node described herein.

Embodiments of a method of operation of a wireless device are also disclosed. In some embodiments, a method of operation of a wireless device in a wireless communication network comprises receiving, from a network node, a control information message for two or more sTTI transmissions, wherein the control information message comprises scheduling information indicating two or more scheduled sTTI for the two or more scheduled sTTI transmissions, respectively, and/or an indication of a timing for the two or more scheduled sTTIs for the two or more scheduled sTTI transmissions and/or an indication of a DMRS configuration for the two or more scheduled sTTIs for the two or more scheduled sTTI transmissions. The method further comprises transmitting and/or receiving the two or more sTTI transmissions in accordance with the control information message.

In some embodiments, the control information message comprises a bit field that indicates the number of scheduled sTTIs. Further, in some embodiments, the two or more scheduled sTTIs are determined by a fixed scheduling timing and the bit field of the control information message that indicates the number of scheduled sTTIs. In some embodiments, a plurality of possible combinations of two or more sTTI transmissions are predefined, and the bit field comprised in the control information message together with an index of a downlink sTTI containing the control message explicitly indicates one of the plurality of possible combinations of two or more sTTI transmissions as a selected combination of sTTIs for the sTTI transmissions. Further, in some embodiments, the control information message is comprised in a short physical downlink control channel. In some other embodiments, a plurality of possible combinations of two or more sTTI transmissions are predefined, and the bit field comprised in the control information message explicitly indicates one of the plurality of possible combinations of two or more sTTI transmissions as a selected combination of sTTIs for the sTTI transmissions. Further, in some embodiments, the control information message is comprised in a physical downlink control channel for a TTI that comprises a plurality of sTTIs.

In some embodiments, a DMRS configuration for each of the plurality of possible combinations of two or more sTTI transmissions is preconfigured. In some other embodiments, the control information comprises a second bit field that indicates a DMRS configuration for the two or more scheduled sTTI transmissions. In some other embodiments, the control information comprises a second bit field that, together with the number of scheduled sTTIs, indicates a DMRS configuration for the two or more scheduled sTTI transmissions. In some embodiments, the DRMS configuration comprises a number of DMRS symbols and/or DMRS symbol positions for the two or more scheduled sTTIs.

In some embodiments, the control information message comprises a first bit field that indicates the number of scheduled sTTIs and a second bit field that indicates a timing of at least a first scheduled sTTI of the two or more sTTIs, and the two or more scheduled sTTIs are determined by the first bit field of the control information message that indicates the number of scheduled sTTIs and the second bit field of the control information message that indicates the timing of at least the first scheduled sTTI.

In some embodiments, the scheduling information is slot-based multi-sTTI scheduling information that schedules all sTTIs in one or more slots as the two or more scheduled sTTIs.

In some embodiments, transmission of the control information message is limited to PDCCH. In some other embodiments, transmission of the control information message is limited to PDCCH and a first sTTI in a second slot of the subframe.

In some embodiments, a DMRS configuration, including both a number of DMRS symbols and DMRS symbol positions, is preconfigured or configured by signaling, for each of a plurality of possible combinations of two or more scheduled sTTIs.

In some embodiments, a DMRS configuration for the scheduled sTTIs, including both a number of DMRS symbols and DMRS symbol positions, is determined by a separate bit field of the control information message.

Embodiments of a wireless device are also disclosed. In some embodiments, a wireless device for a wireless communication network is adapted to perform the method of operation of a wireless device in accordance with any one of the embodiments of the method of operation of a wireless device disclosed herein.

In some embodiments, a wireless device for a wireless communication network comprises at least one transceiver and circuitry associated with the at least one transceiver, the circuitry operable to receive, from a network node via the at least one transceiver, a control information message for one or more sTTI transmissions, wherein the control information message comprises scheduling information indicating one or more scheduled sTTI for the one or more scheduled sTTI transmissions, respectively, and/or an indication of a timing for the one or more scheduled sTTIs for the one or more scheduled sTTI transmissions and/or an indication of a DMRS configuration for the one or more scheduled sTTIs for the one or more scheduled sTTI transmissions. The circuitry is further operable to transmit and/or receive, via the at least one transceiver, the one or more sTTI transmissions in accordance with the control information message.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 14 illustrates an example of n+6 uplink scheduling timing for 2/3 symbol sTTI configurations in both uplink and downlink where sDCI for multi-sTTI scheduling can only be transmitted from PDCCH;

FIG. 15 illustrates an example of n+4 uplink scheduling timing for 2/3 symbol sTTI configurations in both uplink and downlink. Multi-sTTI DCI can only be transmitted from PDCCH according to some embodiments of the present disclosure;

DETAILED DESCRIPTION

Figure 1:
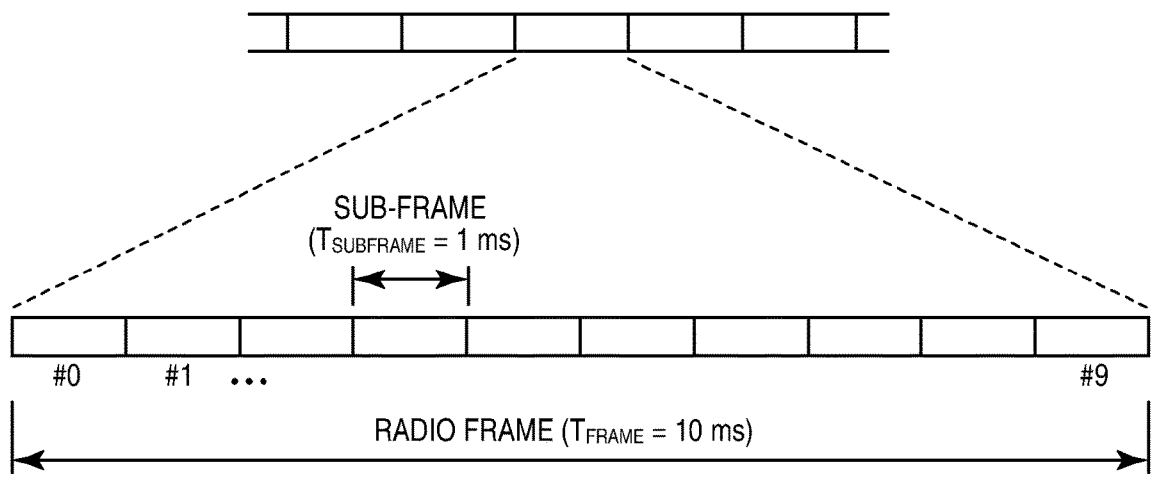
FIG. 1 illustrates an LTE time-domain structure.
Figure 2:
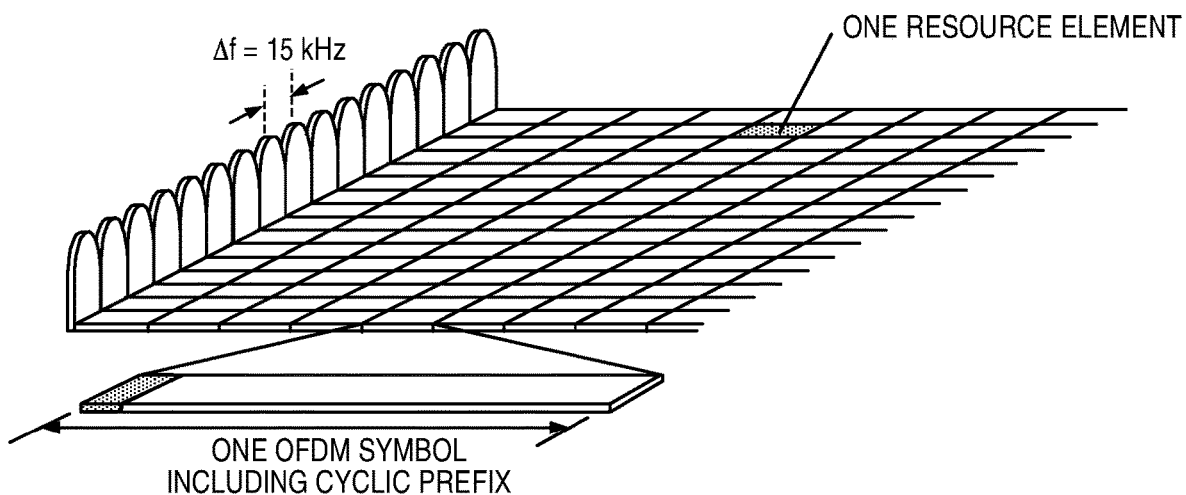
FIG. 2 illustrates an LTE downlink physical resource.
Figure 3:
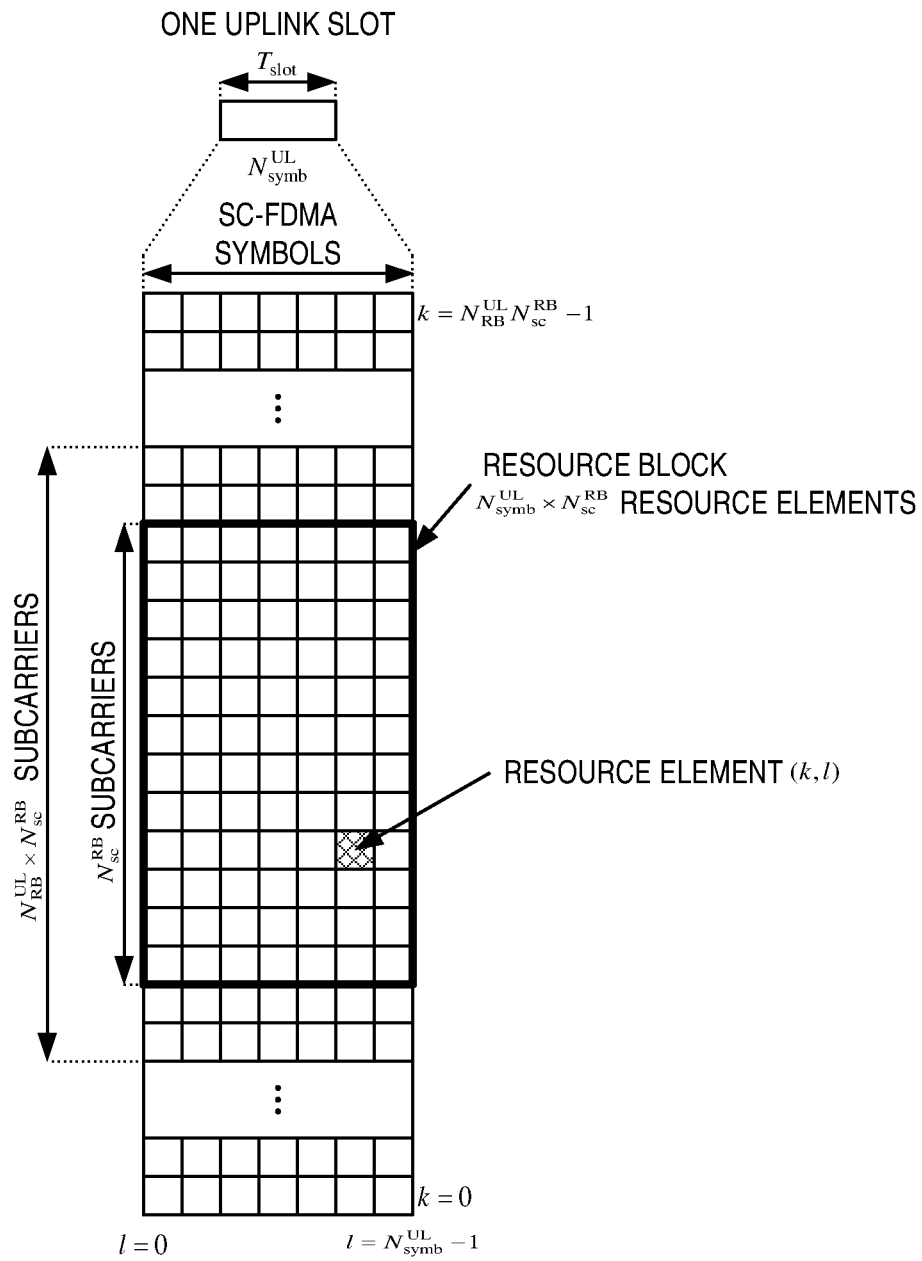
FIG. 3 illustrates an LTE uplink resource grid.
Figure 4:
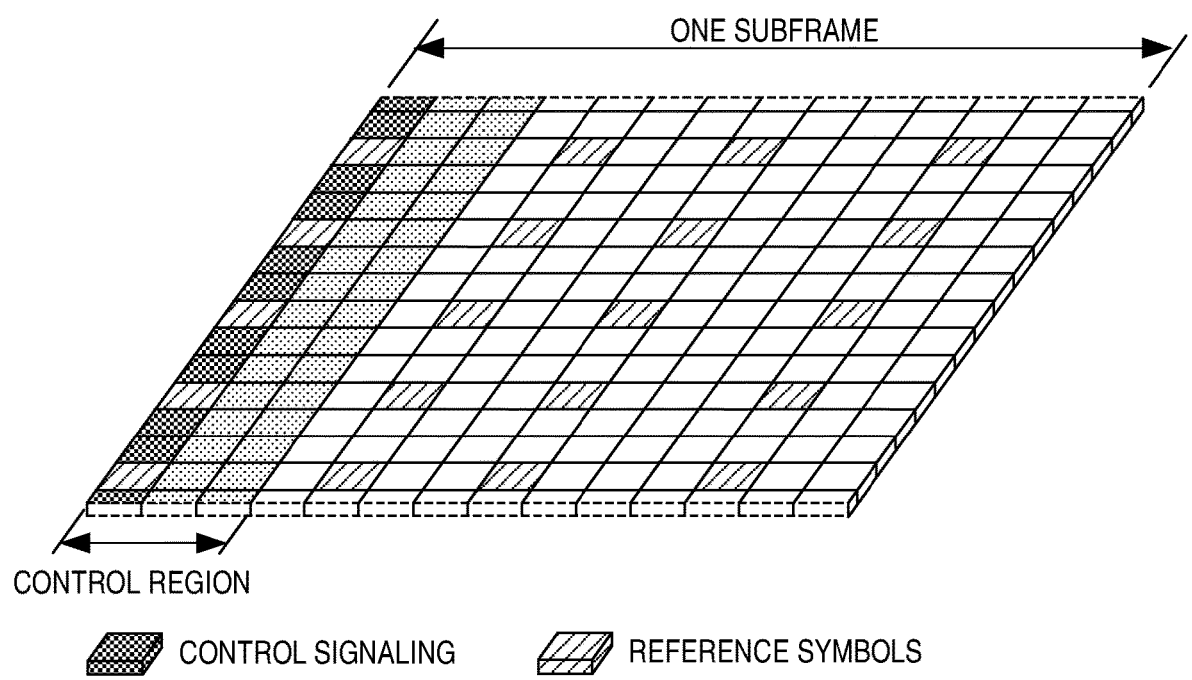
FIG. 4 illustrates an LTE downlink subframe.
Figure 5:
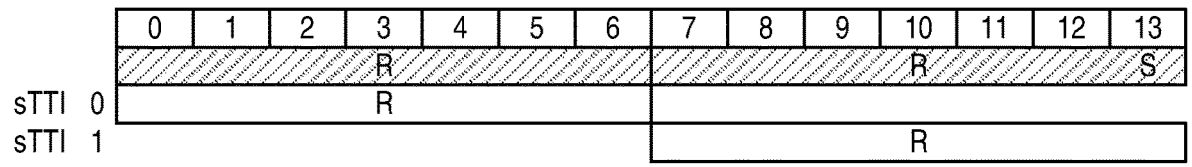
FIG. 5 illustrates an example of 7-symbol sTTI configuration with an uplink subframe.
Figure 6:
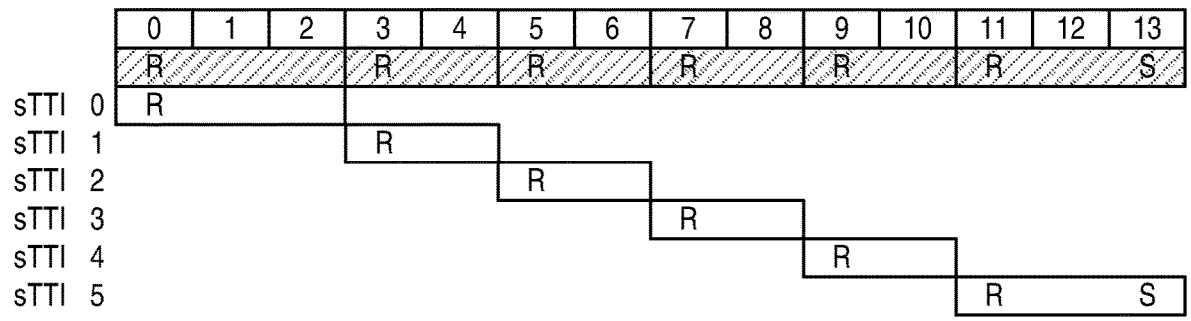
FIG. 6 illustrates an example of a 2/3 symbol sTTI configuration with an uplink subframe.
Figure 7:
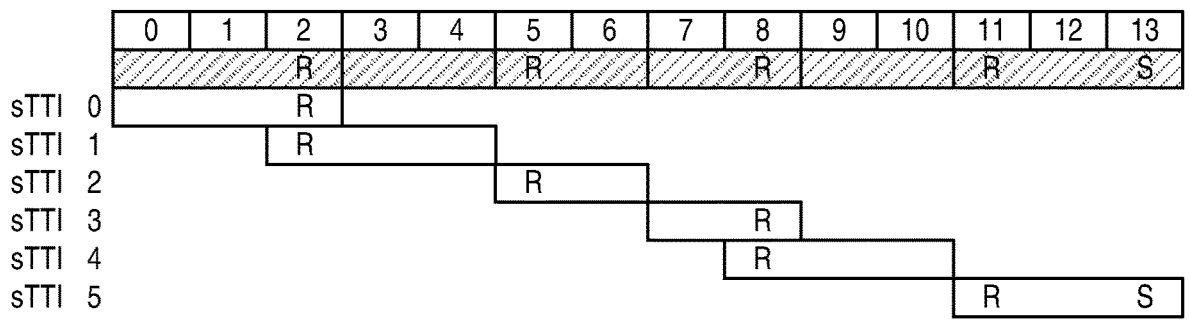
FIG. 7 illustrates an example of 2/3 symbol sTTI configuration with DMRS multiplexing/sharing.
Figure 8:
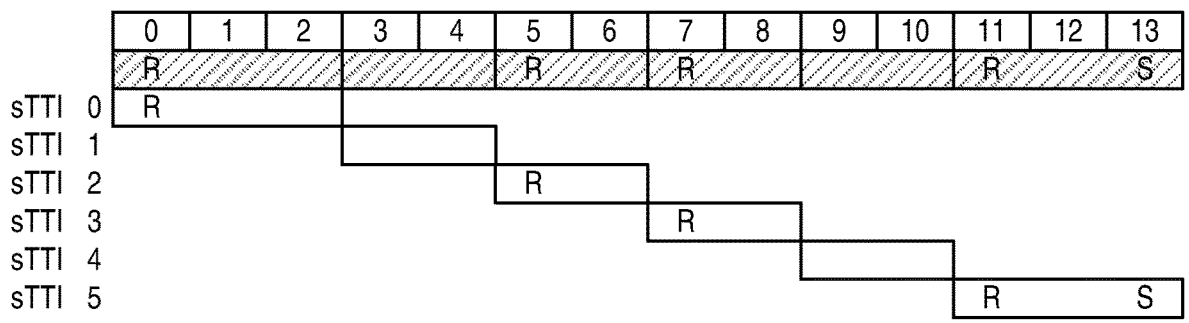
FIG. 8 illustrates an example of a 2/3 symbol sTTI configuration within an uplink subframe with DMRS multiplexing/sharing.
Figure 9:
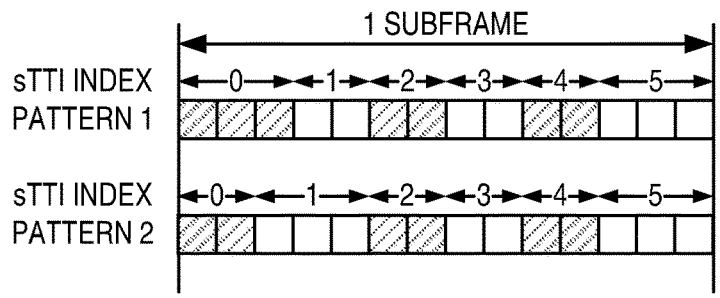
FIG. 9 illustrates examples of a 2/3 symbol sTTI configuration within a downlink subframe.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node:

As used herein, a "radio node" is either a radio access node or a wireless device.

Radio Access Node:

As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an eNB in a 3GPP LTE network), a high-power or macro base station, a low-power base station (e.g., a micro base station, a pico base station, a home eNB, or the like), and a relay node.

Core Network Node:

As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device:

As used herein, a "wireless device" is any type of device that has access to (i.e., is served by) a cellular communications network by wirelessly transmitting and/or receiving signals to a radio access node(s). Some examples of a wireless device include, but are not limited to, a UE in a 3GPP network and a Machine Type Communication (MTC) device.

Network Node:

As used herein, a "network node" is any node that is either part of the radio access network or the core network of a cellular communications network/system.

Short Transmission Time Interval (sTTI):

As used herein, a "sTTI" is a transmission duration that is shorter than a nominal transmission duration. In LTE, the nominal transmission duration is called a subframe and is composed of 14 OFDM/SC-FDMA symbols with normal cyclic prefix. In LTE, a 2 or 3 OFDM symbol long transmission can also be referred to as subslot transmission, while a 7 OFDM symbol long transmission can also be referred to as slot transmission. In NR, the nominal transmission duration is called a slot and is composed of 14 OFDM/SC-FDMA symbols with normal cyclic prefix. In NR, a transmission duration of less than 14 OFDM symbols can also be referred to as PDSCH/PUSCH type B (mini-slot/non-slot based transmission) in NR.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

Using existing technology, in order to schedule an uplink or a downlink sTTI transmission, the eNB transmits corresponding control information using a new DCI format, referred to as short DCI (sDCI), in each downlink sTTI. The control channel carrying this sDCI can be either PDCCH or sPDCCH. However, transmitting sDCI in every single sTTI represents a high control overhead, especially for 2/3-symbol sTTI. This means that the number of available REs to be used for data transmission is reduced due to the RE utilized for the sDCI transmissions. This overhead can be seen as unnecessary when a UE is scheduled in consecutive sTTIs within a 1 ms subframe under similar channel conditions.

For DMRS sharing, a UE is scheduled with multiple consecutive sTTIs, and the DMRS is only transmitted in the first sTTI to reduce the overhead. If an sDCI is intended for scheduling only a single sTTI transmission, then multiple scheduling assignments/grants should be sent for scheduling these consecutive sTTIs. This will increase the control signaling overhead.

In addition, it can cause a reliability issue for DMRS sharing. For example, consider the uplink DMRS sharing case, where the UE misses the first uplink grant, so it will not transmit DMRS. Then, the eNB will not be able to decode the following sTTI transmissions due to lack of channel information.

Different signaling methods for multi-sTTI scheduling for both uplink and downlink sTTI transmissions are disclosed herein. Embodiments of the present disclosure support the scheduling of multiple sTTI transmissions for both downlink and uplink transmissions—CRS based for downlink and DMRS based for downlink and uplink—to reduce both the DMRS overhead based on DMRS sharing and control signaling overhead from the sDCI transmissions. In addition, embodiments of the present disclosure provide the same reliability for DMRS sharing as for the single sTTI transmission for downlink and uplink.

Figure 10:
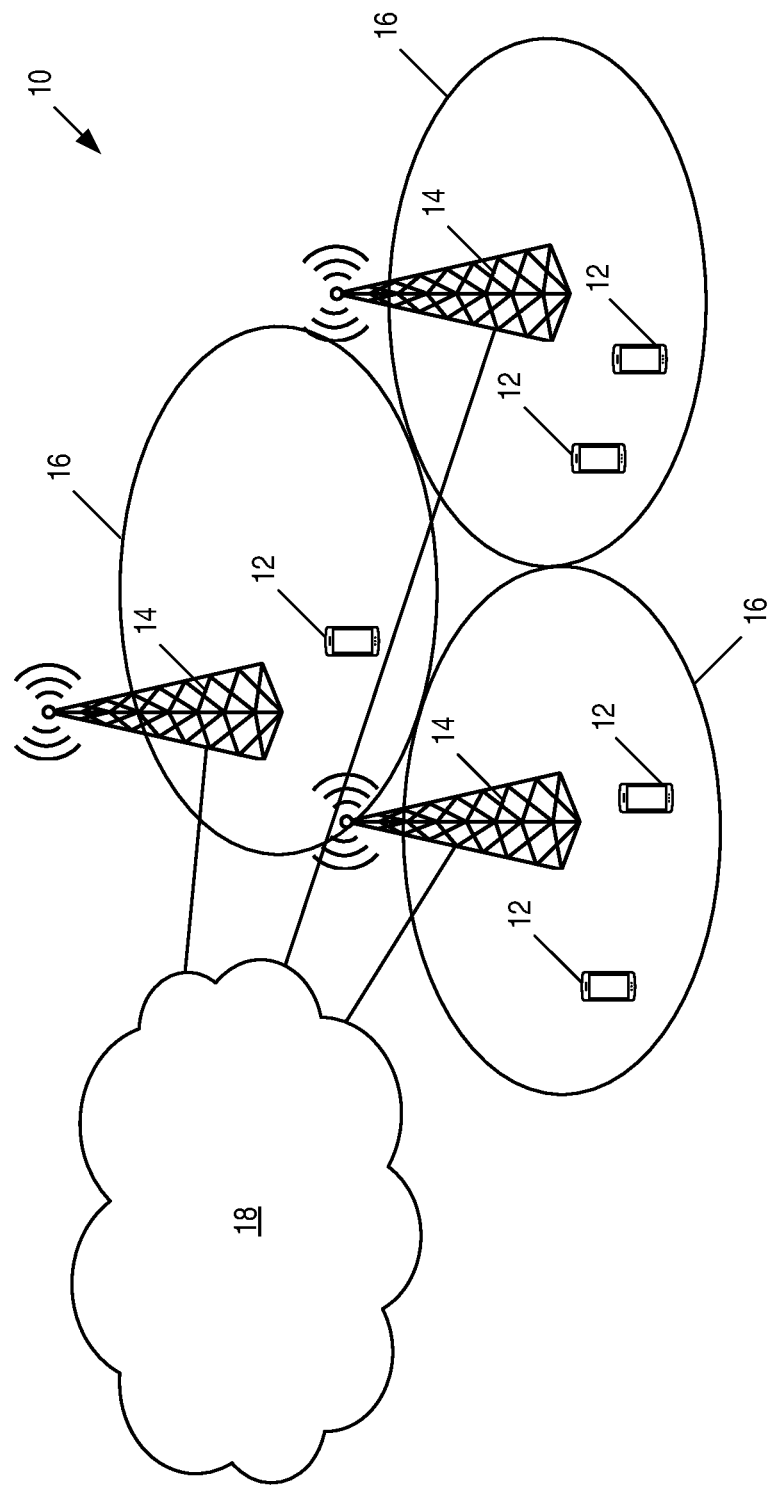
FIG. 10 illustrates one example of a wireless communication system in which embodiments of the present disclosure may be implemented.

FIG. 10 illustrates one example of a wireless communication network 10 (e.g., an LTE (e.g., LTE Advanced (LTE-A), LTE-Pro, or an enhanced version of LTE) or 5G NR network) in which embodiments of the present disclosure may be implemented. As illustrated, a number of wireless devices 12 (e.g., UEs) wirelessly transmit signals to and receive signals from radio access nodes 14 (e.g., eNBs or gNBs, which is a 5G NR base station), each serving one or more cells 16. The radio access nodes 14 are connected to a core network 18.

Figure 11:
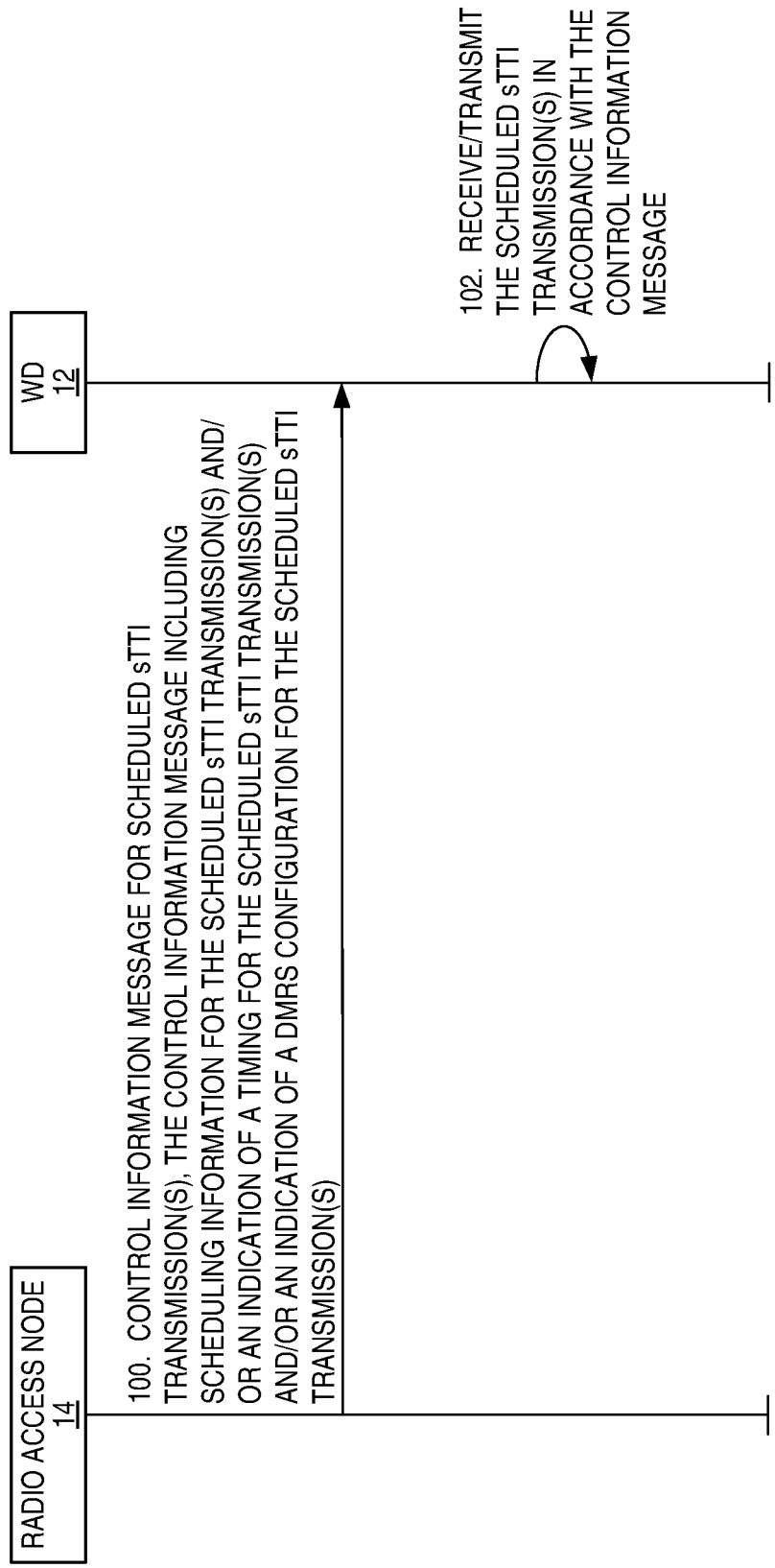
FIG. 11 illustrates the operation of a radio access node and a wireless device according to some embodiments of the present disclosure.

FIG. 11 illustrates the operation of the radio access node 14 and the wireless device 12 according to some embodiments of the present disclosure. In general, this process is performed by the radio access node 14 (or more generally a network node) to provide scheduling of multiple sTTI transmissions in uplink and/or downlink. As illustrated, the radio access node 14 transmits a control information message to the wireless device 12 (step 100). The control information message is for one or more scheduled sTTI transmissions, which may be uplink transmissions or downlink transmissions. The control information message includes scheduling information that indicates the sTTI(s) for the scheduled sTTI transmission(s) and/or an indication of a timing for the scheduled sTTI transmission(s) and/or an indication of a DMRS configuration for the scheduled sTTI transmission(s). Further, as discussed below, in some embodiments, the control information message is for two or more scheduled sTTI transmissions, e.g., in two or more consecutive sTTIs in the time domain.

In some embodiments, the control information message includes scheduling information that indicates the sTTI(s) for the scheduled sTTI transmission(s), where the scheduling information is uplink scheduling information and/or downlink scheduling information. In other words, the scheduled sTTI transmission(s) are uplink transmission(s) or downlink transmission(s). In some embodiments, the control information includes scheduling information that indicates two or more sTTIs for two or more sTTI transmissions, respectively, where the two or more sTTIs are consecutive in the time domain.

In some embodiments, the control information message is referred to as sDCI, and the sDCI can be transmitted from in both PDCCH and sPDCCH. Here, a sPDCCH is used for scheduling both uplink and downlink sTTI transmissions. A sPDCCH can be transmitted in each downlink sTTI, except for the legacy control region. Further, in some embodiments, the sTTIs for the scheduled sTTI transmissions (sometimes referred to herein as scheduled sTTIs) are determined by a fixed scheduling timing and a bit field of the sDCI indicating the number of scheduled sTTIs.

In some embodiments, a DMRS configuration, including both the number of DMRS symbols and the position of the DMRS symbols, is preconfigured or configured by signaling (e.g., Radio Resource Control (RRC) signaling), for each possible combination of multiple scheduled sTTIs. In some other embodiments, the DMRS configuration for the scheduled sTTIs, including both the number of DMRS symbols and the position of the DMRS symbols, is indicated in the sDCI (e.g., indicated by a separate bit field of the sDCI).

In some embodiments, the control information message (for two or more scheduled sTTI transmissions scheduled on two or more sTTIs respectively) is transmitted only once per subframe. Further, in some embodiments, the control information message is carried only on PDCCH.

In some embodiments, the control information message is transmitted only once per slot. For instance, it is carried on PDCCH for the first slot in the subframe, and on the first sPDCCH of the second slot in the subframe. Further, in some embodiments, the possible combinations of multiple scheduled sTTIs are predefined, and a bit field of the sDCI together with a fixed scheduling timing are used to explicitly indicate the selected combination of sTTIs for multi-sTTI transmissions.

In some embodiments, the scheduled sTTIs are determined by a bit field of the sDCI indicating the number of scheduled sTTIs together with a bit field of the sDCI indicating the timing of at least the first scheduled sTTI.

Upon receiving the control information message, the wireless device 12 receives (or downlink embodiments) or transmits (for uplink embodiments) the scheduled sTTI transmissions in accordance with the control information message (step 102). In other words, the wireless device 12 performs data decoding (downlink) or data transmission (uplink) based on the received control information message.

In the following, some examples are provided for how to signal multiple scheduled sTTI transmissions in both uplink and downlink.

In a first embodiment, the control information message, which is referred to as sDCI, can be transmitted from each downlink sTTI. A signaling example is presented below, assuming only consecutive sTTIs can be scheduled, and the maximum number of scheduling sTTIs is three. However, since this is only an example, the present disclosure is not limited thereto.

Figures 12, 13:
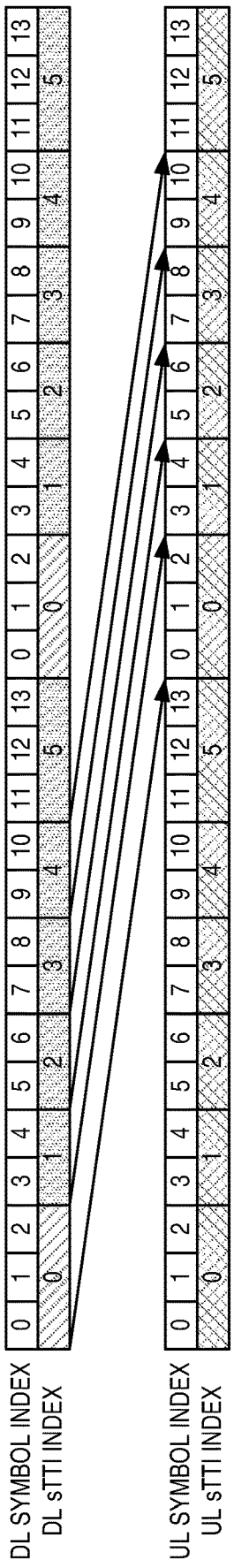
FIG. 12 is an illustration of n+6 uplink scheduling timing for 2/3 symbol sTTI configurations in both uplink and downlink where sDCI can be transmitted in each downlink sTTI according to some embodiments of the present disclosure.
FIG. 13 illustrates an example of using 1 bit in the sDCI for indicating the DMRS configuration of the scheduled multiple sTTIs according to some embodiments of the present disclosure.

FIG. 12 shows the earliest uplink sTTI that can be scheduled from an uplink grant sent in a downlink sTTI considering the n+6 uplink scheduling timing for 2 or 3-symbol sTTI transmissions. For instance, assuming that there are 6 sTTIs per subframe, if an uplink grant is sent in downlink sTTI 0 in subframe n, this grant can schedule uplink sTTI 0 in subframe n+1 at the earliest. If the uplink grant is a multi-sTTI scheduling grant sent in downlink sTTI 0 in subframe n, this grant could schedule uplink sTTI 0 and uplink sTTI 1 in subframe n+1 for instance (but not earlier than uplink sTTI 0 in subframe n+1).

Considering the n+6 uplink scheduling timing for 2 or 3-symbol sTTI transmissions shown in FIG. 12, Table 1 gives the mapping of the value of the 1-bit field in the sDCI to the scheduled multiple consecutive sTTIs.

TABLE 1

An example of using 1 bit in the sDCI for uplink multi-sTTI scheduling with n + 6 scheduling timing

| DL index | | | Scheduled UL sTTI index | |
| --- | --- | --- | --- | --- |
| (sDCI) on subframe (n) | bit field Nrof_sTTI | Number of sTTIs | On subframe (n + 1) | On subframe (n + 2) |
| 0 | 0 | 2 | 0 and 1 | — |
| 0 | 1 | 3 | 0 and 1 and 2 | — |
| 1 | 0 | 2 | 1 and 2 | — |
| 1 | 1 | 3 | 1 and 2 and 3 | — |
| 2 | 0 | 2 | 2 and 3 | — |
| 2 | 1 | 3 | 2 and 3 and 4 | — |
| 3 | 0 | 2 | 3 and 4 | — |
| 3 | 1 | 3 | 3 and 4 and 5 | — |
| 4 | 0 | 2 | 4 and 5 | — |
| 4 | 1 | 3 | 4 and 5 | 0 |
| 5 | 0 | 2 | 5 - | 0 |
| 5 | 1 | 3 | 5 | 0 and 1 |

For downlink scheduling, the same approach can be applied, except that the scheduled downlink sTTI does not have the n+6 scheduling timing constraint. Instead, the downlink scheduling timing can be down to n+0, meaning that the earliest downlink sTTI that can be scheduled by a downlink assignment found in downlink sTTI n is downlink sTTI n. Table 1A gives the mapping of the value of the 1-bit field in the sDCI to the scheduled multiple consecutive sTTIs.

TABLE 1A

An example of using 1 bit in the sDCI for downlink multi-sTTI scheduling with n + 0 scheduling timing

| DL index | | | Scheduled DL sTTI index | |
| --- | --- | --- | --- | --- |
| (sDCI) on subframe (n) | bit field Nrof_sTTI | Number of sTTIs | On subframe (n) | On subframe (n + 1) |
| 0 | 0 | 2 | 0 and 1 | — |
| 0 | 1 | 3 | 0 and 1 and 2 | — |
| 1 | 0 | 2 | 1 and 2 | — |
| 1 | 1 | 3 | 1 and 2 and 3 | — |
| 2 | 0 | 2 | 2 and 3 | — |
| 2 | 1 | 3 | 2 and 3 and 4 | — |
| 3 | 0 | 2 | 3 and 4 | — |
| 3 | 1 | 3 | 3 and 4 and 5 | — |
| 4 | 0 | 2 | 4 and 5 | — |
| 4 | 1 | 3 | 4 and 5 | 0 |
| 5 | 0 | 2 | 5 - | 0 |
| 5 | 1 | 3 | 5 | 0 and 1 |

The DMRS configuration for each scheduled multi-sTTI combination can be preconfigured for both uplink transmissions and DMRS-based downlink transmissions. For example, for uplink multi-sTTI scheduling, the DMRS is always placed at the first SC-FDMA symbol of the first scheduled uplink sTTI. As another example, for downlink multi-sTTI scheduling, the DMRS is always placed at the first OFDM symbol of the first scheduled downlink sTTI. It is also possible to re-configure the DMRS position by RRC signaling to adapt the channel conditions.

Another way is to use a separate bit field in the sDCI for indicating the DMRS configuration, so that the DMRS configuration can dynamically adapt to the channel conditions. FIG. 13 illustrates an example of how to use 1 bit in the sDCI for indicating the DMRS configuration for some multi-sTTI combinations in uplink.

In the downlink, there should always be DMRS symbols in the first sTTI of the series of sTTIs scheduled with multi-sTTI scheduling. This enables the UE to start decoding the first sTTI of the series before the other sTTIs, as in case of single sTTI scheduling, and send the corresponding downlink HARQ feedback after the predefined downlink HARQ feedback delay. A dynamic DMRS configuration can allow changing the periodicity of the DMRS insertion in the series of scheduled sTTIs starting from the first sTTI. For instance, if the field for DMRS configuration is set to 0, only the first sTTI of the series of scheduled sTTIs contains DMRS. If the field is set to 1, every second sTTI of the series contains DMRS, starting from the first sTTI.

In the downlink, the DMRS configuration field can also have a different interpretation depending on the number of scheduled sTTIs in the series. For instance, if the field for DMRS configuration is set to 0 and the number of scheduled sTTI in the series is less than the number of sTTIs in a subframe, only the first sTTI of the series of scheduled sTTIs contains DMRS. If the field for DMRS configuration is set to 0 and the number of scheduled sTTI in the series equals the number of sTTIs of a subframe (i.e. 6 sTTIs for LTE 2os TTI), the first sTTI of each LTE slot contains DMRS. If the field is set to 1, every second sTTI of the series contains DMRS, starting from the first sTTI.

In a second embodiment, sDCI for multi-sTTI scheduling can only be transmitted from PDCCH. In other words, in order to reduce the signaling overhead and the blind decoding complexity at the UE (e.g., the wireless device 12), it can be restricted that the sDCI for multi-sTTI scheduling, defined as multi-sTTI DCI, is only transmitted from PDCCH. In the following, two signaling examples are given, assuming that only consecutive sTTIs can be scheduled in the multi-sTTI DCI. However, since this is only an example, the present disclosure is not limited thereto.

Given this method, the UE (e.g., the wireless device 12) monitors the multi-sTTI DCI in PDCCH only. Consequently, the UE does not expect DCI for multi-sTTI scheduling on sPDCCH. But, it does monitor both single and multi-sTTI DCIs in PDCCH. Additionally, if a multi-sTTI scheduling for downlink/uplink assignment is found in PDCCH, the UE would not need to search for an sDCI in the already scheduled sTTIs. For the sTTIs which are not scheduled by the multi-sTTI DCI transmitted in PDCCH, the UE should monitor sDCI.

In a first variation of the second embodiment, a single bit field is included in the control information for indicating the scheduled sTTIs. Considering the n+6 uplink scheduling timing for 2 or 3-symbol sTTI transmissions shown in FIG. 14, Table 2 lists all the possible combinations of multiple consecutive sTTIs that can be scheduled by sending a multi-sTTI DCI from the PDCCH. It can be seen that 4 bits are sufficient for indicating all possible combinations for the uplink or downlink multi-sTTI scheduling. Note that in this case, the downlink sTTIs belong to the same subframe where the multi-sTTI DCI is transmitted, while uplink sTTIs are in the next subframe.

The same method can be used for other uplink scheduling timing as well. For example, as shown in FIG. 15 and Table 3, considering the n+4 scheduling timing, it is also possible to use 4 bits to indicate the scheduled multiple sTTIs. Note that in this case, the sTTI 4 and sTTI 5 are in the same subframe where the multi-sTTI DCI is transmitted, while sTTI 0, 1, 2, and 3 are in the next subframe.

TABLE 2

A bit field of sDCI for uplink multi-sTTI scheduling with n + 6 scheduling timing or downlink multi-sTTI with n + 0 scheduling timing.

| bit field | Scheduled UL/DL sTTI index |
|---|---|
| 0 0 0 0 | 0 and 1 |
| 0 0 0 1 | 1 and 2 |
| 0 0 1 0 | 2 and 3 |
| 0 0 1 1 | 3 and 4 |
| 0 1 0 0 | 4 and 5 |
| 0 1 0 1 | 0 and 1 and 2 |
| 0 1 1 0 | 1 and 2 and 3 |
| 0 1 1 1 | 2 and 3 and 4 |
| 1 0 0 0 | 3 and 4 and 5 |
| 1 0 0 1 | 0 and 1 and 2 and 3 |
| 1 0 1 0 | 1 and 2 and 3 and 4 |
| 1 0 1 1 | 2 and 3 and 4 and 5 |
| 1 1 0 0 | 0 and 1 and 2 and 3 and 4 |
| 1 1 0 1 | 1 and 2 and 3 and 4 and 5 |
| 1 1 1 0 | 0 and 1 and 2 and 3 and 4 and 5 |
| 1 1 1 1 | reserved |

TABLE 3

A bit field of sDCI for uplink multi-sTTI scheduling with n + 4 scheduling timing

| bit field | Scheduled UL sTTI index |
|---|---|
| 0 0 0 0 | 4 and 5 |
| 0 0 0 1 | 5 and 0 |
| 0 0 1 0 | 0 and 1 |
| 0 0 1 1 | 1 and 2 |
| 0 1 0 0 | 2 and 3 |
| 0 1 0 1 | 4 and 5 and 0 |
| 0 1 1 0 | 5 and 0 and 1 |
| 0 1 1 1 | 0 and 1 and 2 |
| 1 0 0 0 | 1 and 2 and 3 |
| 1 0 0 1 | 4 and 5 and 0 and 1 |
| 1 0 1 0 | 5 and 0 and 1 and 2 |
| 1 0 1 1 | 0 and 1 and 2 and 3 |
| 1 1 0 0 | 4 and 5 and 0 and 1 and 2 |
| 1 1 0 1 | 5 and 0 and 1 and 2 and 3 |
| 1 1 1 0 | 4 and 5 and 0 and 1 and 2 and 3 |
| 1 1 1 1 | reserved |

In practice, not all these 15 combinations shown in Table 1 and Table 2 are needed. For example, to keep good channel estimation performance, the maximum number of consecutive sTTIs that is allowed can be limited to 3. In this case, only 3 bits are needed for the signaling. It is also possible to reduce the signaling overhead by removing some combinations, e.g., the ones that all scheduled sTTIs are not within the same subframe, or not within the same slot.

As an enhancement of the described method, the reserved combination (e.g., 1111) can be reused to convey signaling for a single sTTI scheduling. Thereby, the eNB can schedule either single or multiple sTTI using same multi-sTTI DCI format in PDCCH. Given that, the UE may monitor only multi-sTTI (downlink and uplink) DCIs on PDCCH. For instance, if the bit field is set to 1111 in downlink multi-sTTI DCI, the scheduled downlink sTTI index is 0. if the bit field is set to 1111 in uplink multi-sTTI DCI, the scheduled uplink sTTI index is 4 in same subframe or 0 in next subframe for n+4 and n+6 uplink scheduling timing, respectively. The methods on DMRS configuration discussed above with respect to method 1 apply for method 2 as well. For the sTTIs which are not scheduled by the multi-sTTI DCI transmitted in PDCCH, the UE should monitor sDCI.

In a second variation of the second embodiment, two different bit fields are included in the control information and used to indicate the scheduled sTTIs. In other words, another method for signaling the scheduled multiple sTTIs is by using two separate bit fields, one for indicating the timing, i.e., $n+k+\Delta_I$, of the first scheduled sTTI, and the other field for indicating the number of the scheduling sTTIs. Table 4 illustrates an example of using this signaling method, assuming n+6 minimum scheduling timing. Note that in this case, the downlink sTTIs belong to the same subframe where the multi-sTTI DCI is transmitted, while uplink sTTI are in the next subframe.

Similarly, the number of required signaling bits can be reduced by removing some combinations.

TABLE 4

An example of using two different bit fields of the sDCI for uplink and downlink multi-sTTI scheduling with $n + k + \Delta I$ scheduling timing and k = 6

| Bit field for Number_of_sTTI | Bit field for timing | Number of sTTIs | Timing offset, ΔI | Scheduled UL/DL sTTI index |
|---|---|---|---|---|
| 0 0 0 | 0 0 0 | 2 | 0 | 0 and 1 |
| 0 0 0 | 0 0 1 | 2 | 1 | 1 and 2 |
| 0 0 0 | 0 1 0 | 2 | 2 | 2 and 3 |
| 0 0 0 | 0 1 1 | 2 | 3 | 3 and 4 |
| 0 0 0 | 1 0 0 | 2 | 4 | 4 and 5 |
| 0 0 1 | 0 0 0 | 3 | 0 | 0 and 1 and 2 |
| 0 0 1 | 0 0 1 | 3 | 1 | 1 and 2 and 3 |
| 0 0 1 | 0 1 0 | 3 | 2 | 2 and 3 and 4 |
| 0 0 1 | 0 1 1 | 3 | 3 | 3 and 4 and 5 |
| 0 1 0 | 0 0 0 | 4 | 0 | 0 and 1 and 2 and 3 |
| 0 1 0 | 0 0 1 | 4 | 1 | 1 and 2 and 3 and 4 |
| 0 1 0 | 0 1 0 | 4 | 2 | 2 and 3 and 4 and 5 |
| 0 1 1 | 0 0 0 | 5 | 0 | 0 and 1 and 2 and 3 and 4 |
| 0 1 1 | 0 0 1 | 5 | 1 | 1 and 2 and 3 and 4 and 5 |
| 1 0 0 | 0 0 0 | 6 | 0 | 0 and 1 and 2 and 3 and 4 and 5 |
| others | others | reserved | reserved | reserved |

Similar to the enhancement in the first variation of the second embodiment, single sTTI scheduling can be supported by the multi-sTTI DCI. The UE may monitor only multi-sTTI (downlink/uplink) DCI in PDCCH. For the sTTIs which are not scheduled by the multi-sTTI DCI transmitted in PDCCH, the UE should monitor sDCI.

In a third embodiment, slot-based multi-sTTI scheduling DCI is provided. The third embodiment allows scheduling a minimum of one complete slot. The third embodiment can be seen as a subset of the first and second embodiments. Using slot-based multi-sTTI DCI, the eNB can schedule all sTTIs in the first slot, all sTTIs in the second slot, or all sTTIs in both slots. Table 5 shows an example.

Multi-sTTI DCI can be limited to PDCCH or additionally to the first sTTI in the second slot of the subframe.

In case of six sTTIs per subframe and an uplink scheduling timing of n+6, the third embodiment is well suited for scheduling multiple uplink sTTIs of a slot from the first downlink sTTI of a slot. The third embodiment can however also be applied in case that the uplink scheduling timing k in n+k does not correspond to the number of sTTIs per subframe, p (i.e., p is not equal to k). In that case, two alternatives exist. In the first alternative, a rule is defined for the UEs so that a multi-sTTI uplink grant received in a downlink sTTI n indicates scheduling of sTTIs of slots starting at the earliest at or after the uplink scheduling timing n+k. In the second alternative, a Timing offset, $\Delta_I$ can be signaled in the uplink multi-sTTI DCI to adjust the timing of the sTTI scheduled to start from the next possible slot after n+k.

TABLE 5

An example of using slot based scheduling sDCI for uplink and downlink multi-sTTI scheduling with respectively n + 6 and n + 0 scheduling timing.

| sDCI index on subframe (n) | Bit field | Scheduled DL sTTI in slot index on subframe (n) | Scheduled DL sTTI in slot index on subframe (n + 1) | Scheduled UL sTTI in slot index on subframe (n + 1) | Scheduled UL sTTI in slot index on subframe (n + 2) |
| --- | --- | --- | --- | --- | --- |
| 0 | 00 | 0 | — | 0 | — |
| 0 | 01 | 1 | — | 1 | — |
| 0 | 10 | 0 and 1 | — | 0 and 1 | — |
| 0 | Reserved | Reserved | Reserved | Reserved | Reserved |
| 3 | 00 | 1 | — | 1 | — |
| 3 | 01 | — | 0 | — | 0 |
| 3 | 10 | 1 | 0 | 1 | 0 |
| 3 | Reserved | Reserved | Reserved | Reserved | Reserved |

Single sTTI scheduling can be supported by the multi-sTTI DCI by reusing the reserved combination. So that the UE may monitor only multi-sTTI (downlink/uplink) DCI in PDCCH and the first sTTI of the second slot. For the sTTIs within each slot which are not scheduled by the respective multi-sTTI DCI, the UE should monitor sDCI.

Other aspects of the present disclosure relating to multi-sTTI DCI will now be described. To limit the number of additional bits in the DCI for multi-sTTI scheduling, i.e. multi-sTTI DCI, restrictions such as same MCS, Precoding Matrix Indicator (PMI), and resource allocation are valid options. Those fields are not expected to change significantly within consecutive sTTIs. The following fields are not extended per sTTI; instead, the same value is applied for all scheduled sTTIs:

Resource allocation header (resource allocation type 0/type 1)
Resource block assignment
TCP command for PUCCH
Downlink assignment index
HARQ process number
MCS/TB
Precoding information depending on TM On the other hand, RV and NDI fields should be specified per sTTI to enable multiplexing of new data and retransmissions on different sTTIs using one DCI. Thereby, the length of NDI field is equivalent to the configured maximum number of sTTI scheduled by DCI for multi-sTTI scheduling.

As for the HARQ Identifier (ID) number, the DCI for the multi-subframe scheduling includes the HARQ process number for the first subframe (i) in the scheduled burst. The HARQ process number for the remaining subframe in (i+1, . . . N−1) are decided based on the following equation:

$$\mathrm{mod}(n_{HARQ\_ID}+i, N_{HARQ})$$

the value of $n_{HARQ\_ID}$ is determined by the HARQ process number field in the corresponding DCI format
the value of $N_{HARQ}$ is the number of configured HARQ processes.

the value of N is determined by the number of scheduled sTTI in the corresponding DCI format.

Figure 16:
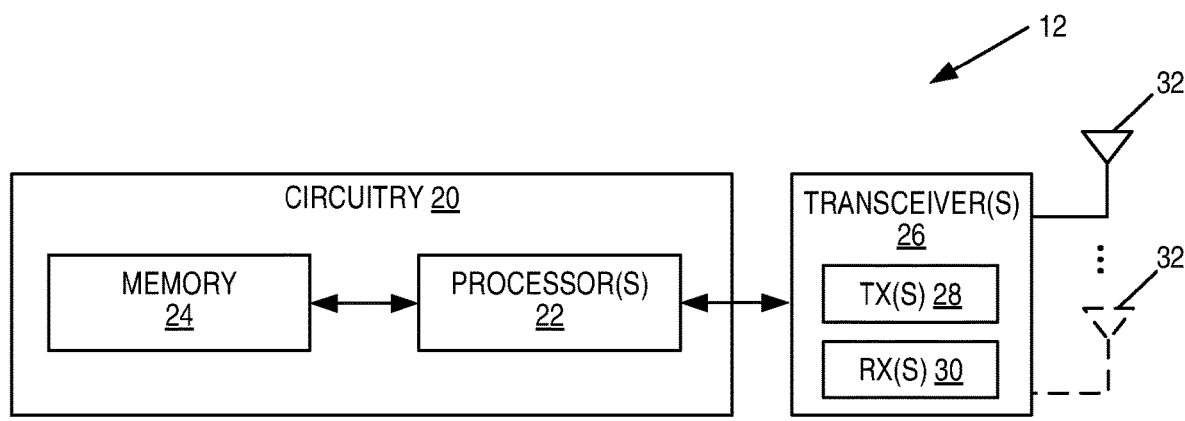
FIGS. 16 and 17 illustrate example embodiments of a wireless device.

FIG. 16 is a schematic block diagram of the wireless device 12 (e.g., UE) according to some embodiments of the present disclosure. As illustrated, the wireless device 12 includes circuitry 20 comprising one or more processors 22 (e.g., Central Processing Units (CPUs), Application Specific Integrated Circuits (ASICs), Field Programmable Gate Arrays (FPGAs), Digital Signal Processors (DSPs), and/or the like) and memory 24. The wireless device 12 also includes one or more transceivers 26 each including one or more transmitters 28 and one or more receivers 30 coupled to one or more antennas 32. In some embodiments, the functionality of the wireless device 12 (e.g., the functionality of a UE) described herein may be implemented in hardware (e.g., via hardware within the circuitry 20 and/or within the processor(s) 22) or be implemented in a combination of hardware and software (e.g., fully or partially implemented in software that is, e.g., stored in the memory 24 and executed by the processor(s) 22).

In some embodiments, a computer program including instructions which, when executed by the at least one processor 22, causes the at least one processor 22 to carry out at least some of the functionality of the wireless device 12 (e.g., the functionality of a UE) according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 17:
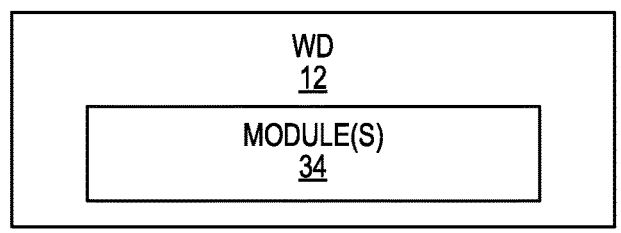

FIG. 17 is a schematic block diagram of the wireless device 12 (e.g., UE) according to some other embodiments of the present disclosure. The wireless device 12 includes one or more modules 34, each of which is implemented in software. The module(s) 34 provide the functionality of the wireless device 12 described herein. For example, the modules(s) 34 may include a receiving/transmitting module operable to perform the function of step 102 of FIG. 11.

Figure 18:
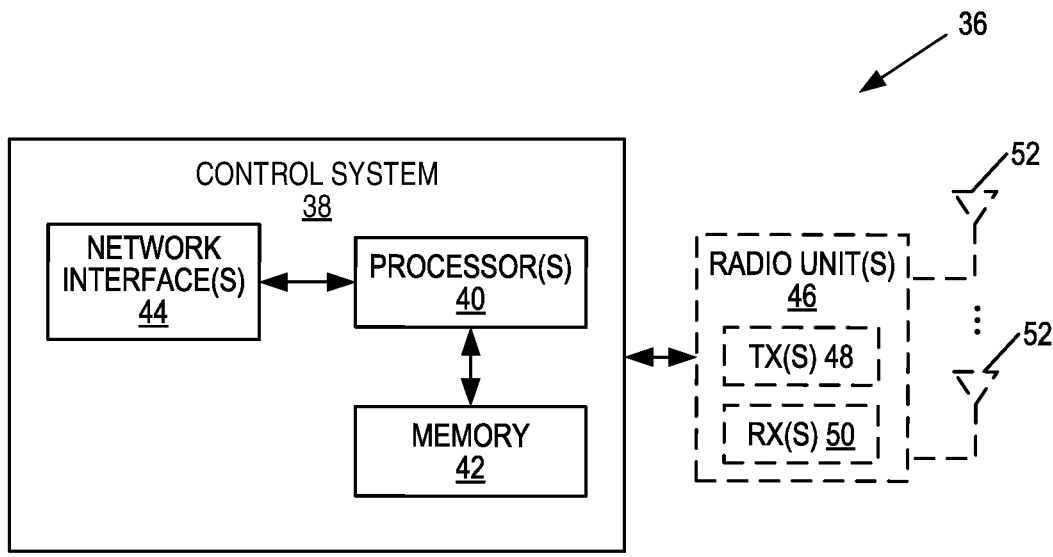
FIGS. 18 through 20 illustrate example embodiments of a network node (e.g., a radio access node).

FIG. 18 is a schematic block diagram of a network node 36 (e.g., a radio access node 14 such as, for example, an eNB or gNB) or a core network node according to some embodiments of the present disclosure. As illustrated, the network node 36 includes a control system 38 that includes circuitry comprising one or more processors 40 (e.g., CPUs, ASICs, DSPs, FPGAs, and/or the like) and memory 42. The control system 38 also includes a network interface 44. In embodiments in which the network node 36 is a radio access node 14, the network node 36 also includes one or more radio units 46 that each include one or more transmitters 48 and one or more receivers 50 coupled to one or more antennas 52. In some embodiments, the functionality of the network node 36 (specifically the functionality of the radio access node 14 or eNB) described above may be fully or partially implemented in software that is, e.g., stored in the memory 42 and executed by the processor(s) 40.

Figure 19:
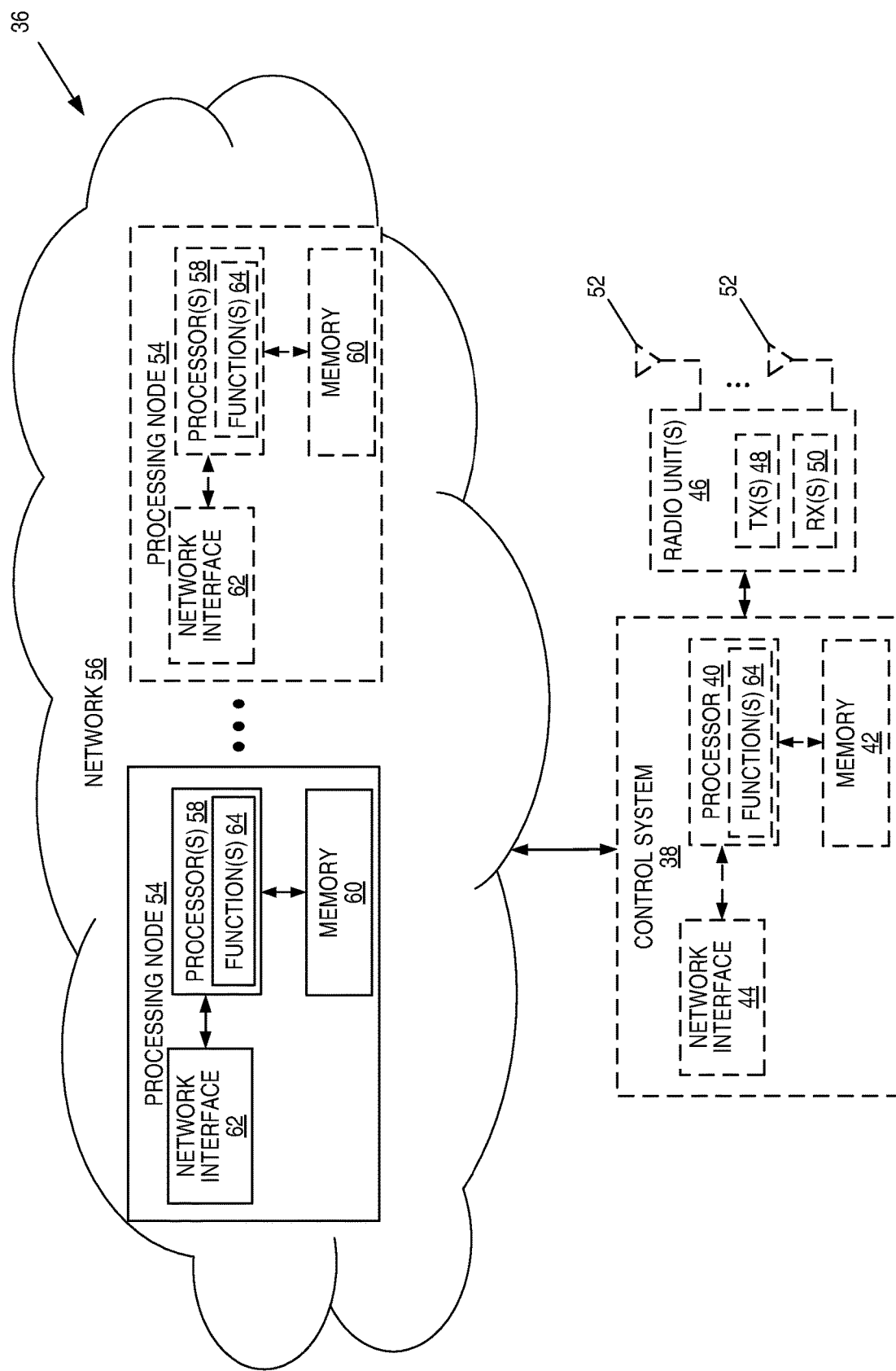

FIG. 19 is a schematic block diagram that illustrates a virtualized embodiment of the network node 36 (e.g., the radio access node 14 or a core network node) according to some embodiments of the present disclosure. As used herein, a "virtualized" network node 36 is a network node 36 in which at least a portion of the functionality of the network node 36 is implemented as a virtual component (e.g., via a virtual machine(s) executing on a physical processing node(s) in a network(s)). As illustrated, the network node 36 optionally includes the control system 38, as described with respect to FIG. 18. In addition, if the network node 36 is the radio access node 14, the network node 36 also includes the one or more radio units 46, as described with respect to FIG. 18. The control system 38 (if present) is connected to one or more processing nodes 54 coupled to or included as part of a network(s) 56 via the network interface 44. Alternatively, if the control system 38 is not present, the one or more radio units 46 (if present) are connected to the one or more processing nodes 54 via a network interface(s). Alternatively, all of the functionality of the network node 36 (e.g., all of the functionality of the radio access node 14 or eNB) described herein may be implemented in the processing nodes 54. Each processing node 54 includes one or more processors 58 (e.g., CPUs, ASICs, DSPs, FPGAs, and/or the like), memory 60, and a network interface 62.

In this example, functions 64 of the network node 36 (e.g., the functions of the radio access node 14 or eNB) described herein are implemented at the one or more processing nodes 54 or distributed across the control system 38 (if present) and the one or more processing nodes 54 in any desired manner. In some particular embodiments, some or all of the functions 64 of the network node 36 described herein are implemented as virtual components executed by one or more virtual machines implemented in a virtual environment(s) hosted by the processing node(s) 54. As will be appreciated by one of ordinary skill in the art, additional signaling or communication between the processing node(s) 54 and the control system 38 (if present) or alternatively the radio unit(s) 46 (if present) is used in order to carry out at least some of the desired functions. Notably, in some embodiments, the control system 38 may not be included, in which case the radio unit(s) 46 (if present) communicates directly with the processing node(s) 54 via an appropriate network interface(s).

In some particular embodiments, higher layer functionality (e.g., layer 3 and up and possibly some of layer 2 of the protocol stack) of the network node 36 may be implemented at the processing node(s) 54 as virtual components (i.e., implemented "in the cloud") whereas lower layer functionality (e.g., layer 1 and possibly some of layer 2 of the protocol stack) may be implemented in the radio unit(s) 46 and possibly the control system 38.

In some embodiments, a computer program including instructions which, when executed by the at least one processor 40, 58, causes the at least one processor 40, 58 to carry out the functionality of the network node 36 or a processing node 54 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 60).

Figure 20:
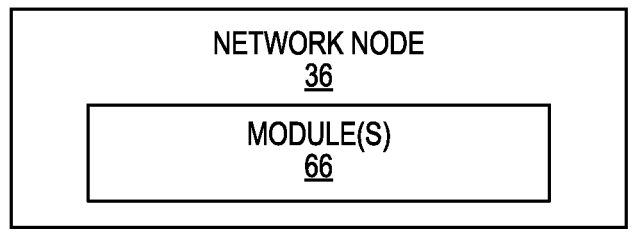

FIG. 20 is a schematic block diagram of the network node 36 (e.g., the radio access node 14 or a core network node) according to some other embodiments of the present disclosure. The network node 36 includes one or more modules 66, each of which is implemented in software. The module(s) 66 provide the functionality of the network node 36 described herein. In some embodiments, the module(s) 66 comprise, for example, a transmitting module operable to transmit the control information message as described above, e.g., with respect to step 100 of FIG. 11.

While not being limited thereto, some example embodiments of the present disclosure are provided below.

Embodiment 1

A method of operation of a network node (14) of a wireless communication network (10) for scheduling multiple sTTI transmissions, comprising: transmitting (100) a control information message to a wireless device (12) for one or more sTTI transmissions; wherein the control information message comprises scheduling information indicating one or more scheduled sTTI for the one or more scheduled sTTI transmissions, respectively, and/or an indication of a timing for the one or more scheduled sTTIs for the one or more scheduled sTTI transmissions and/or an indication of a DMRS configuration for the one or more scheduled sTTIs for the one or more scheduled sTTI transmissions.

Embodiment 2

The method of embodiment 1 wherein the one or more sTTI transmissions comprise one or more uplink sTTI transmissions and/or one or more downlink sTTI transmissions.

Embodiment 3

The method of embodiment 1 or 2 wherein the one or more sTTI transmissions comprise two or more sTTI transmissions scheduled for two or more sTTIs, respectively.

Embodiment 4

The method of embodiment 3 wherein the two or more scheduled sTTIs are consecutive in the time domain.

Embodiment 5

The method of any one of embodiments 1 to 4 wherein the control information message is transmitted on a physical downlink control channel.

Embodiment 6

The method of any one of embodiments 1 to 4 wherein the control information message is transmitted on a short physical downlink control channel used for scheduling sTTI transmissions.

Embodiment 7

The method of any one of embodiments 1 to 4 wherein the control information message can be transmitted on either a physical downlink control channel or a short physical downlink control channel used for scheduling both uplink and downlink sTTI transmissions.

Embodiment 8

The method of embodiment 6 or 7 wherein a short physical downlink control channel can be transmitted in each downlink sTTI, except for a legacy control region.

Embodiment 9

The method of any one of embodiments 1 to 8 wherein the control information message comprises a bit field that indicates the number of scheduled sTTIs, and the scheduled sTTIs are determined by a fixed scheduling timing and the bit field of the control information message that indicates the number of scheduled sTTIs.

Embodiment 10

The method of any one of embodiments 1 to 8 wherein: the one or more scheduled sTTI transmissions comprise two or more sTTI transmissions scheduled on two or more scheduled sTTIs, respectively; a plurality of possible combinations of two or more sTTI transmissions are predefined; and a bit field of the control information message together with a fixed scheduling timing are used to explicitly indicate a selected combination of sTTIs for the sTTI transmissions.

Embodiment 11

The method of any one of embodiments 1 to 8 wherein the control information message comprises a first bit field that indicates the number of scheduled sTTIs and a second bit field that indicates a timing of at least a first scheduled sTTI of the one or more sTTIs, and the scheduled sTTIs are determined by the first bit field of the control information message that indicates the number of scheduled sTTIs and the second bit field of the control information message that indicates the timing of at least the first scheduled sTTI.

Embodiment 12

The method of any one of embodiments 1 to 11 wherein the one or more scheduled sTTI transmissions comprise two or more sTTI transmissions scheduled on two or more scheduled sTTIs, respectively, and a DMRS configuration, including both a number of DMRS symbols and DMRS symbol positions, is preconfigured or configured by signaling, for each possible combination of two or more scheduled sTTIs.

Embodiment 13

The method of any one of embodiments 1 to 11 wherein the one or more scheduled sTTI transmissions comprise two or more sTTI transmissions scheduled on two or more scheduled sTTIs, respectively, and a DMRS configuration for the scheduled sTTIs, including both a number of DMRS symbols and DMRS symbol positions, is determined by a separate bit field of the control information message.

Embodiment 14

The method of any one of embodiments 1 to 13 wherein the control information message is transmitted only once per subframe, and it is carried only on PDCCH.

Embodiment 15

The method of any one of embodiments 1 to 13 wherein the control information message is transmitted only once per slot (e.g., it is carried on PDCCH for the first slot in the subframe, and on the first short PDCCH of the second slot in the subframe).

Embodiment 16

A network node (14) for a wireless communication network (10) for scheduling multiple sTTI transmissions, the network node (14) adapted to perform the method of any one of embodiments 1 to 15.

Embodiment 17

A network node (14) for a wireless communication network (10) for scheduling multiple sTTI transmissions, comprising: at least one processor (40, 58); and memory (42, 60) storing instructions executable by the at least one processor (40, 58) whereby the network node (14) is operable to perform the method of any one of embodiments 1 to 15.

Embodiment 18

A network node (14) for a wireless communication network (10) for scheduling multiple sTTI transmissions, comprising: one or more modules (66) operable to perform the method of any one of embodiments 1 to 15.

Embodiment 19

A computer program comprising instructions which, when executed on at least one processor, cause the at least one processor to carry out the method according to any one of embodiments 1 to 15.

Embodiment 20

A carrier containing the computer program of embodiment 19, wherein the carrier is one of an electronic signal, an optical signal, a radio signal, or a computer readable storage medium.

Embodiment 21

A method of operation of a wireless device (12) in a wireless communication network (10), comprising: receiving (100), from a network node (14), a control information message for one or more sTTI transmissions, wherein the control information message comprises scheduling information indicating one or more scheduled sTTI for the one or more scheduled sTTI transmissions, respectively, and/or an indication of a timing for the one or more scheduled sTTIs for the one or more scheduled sTTI transmissions and/or an indication of a DMRS configuration for the one or more scheduled sTTIs for the one or more scheduled sTTI transmissions; and transmitting and/or receiving (102) the one or more sTTI transmissions in accordance with the control information message.

Embodiment 22

A wireless device (12) for a wireless communication network (10), the wireless device (12) adapted to perform the method of embodiment 21.

Embodiment 23

A wireless device (12) for a wireless communication network (10), comprising: at least one transceiver (26); and circuitry (20) associated with the at least one transceiver (26), the circuitry (20) operable to: receive, from a network node (14) via the at least one transceiver (26), a control information message for one or more sTTI transmissions, wherein the control information message comprises scheduling information indicating one or more scheduled sTTI for the one or more scheduled sTTI transmissions, respectively, and/or an indication of a timing for the one or more scheduled sTTIs for the one or more scheduled sTTI transmissions and/or an indication of a DMRS configuration for the one or more scheduled sTTIs for the one or more scheduled sTTI transmissions; and transmit and/or receive, via the at least one transceiver (26), the one or more sTTI transmissions in accordance with the control information message.

Embodiment 24

A wireless device (12) for a wireless communication network (10), comprising: a receiving module (34) operable to receive, from a network node (14), a control information message for one or more sTTI transmissions, wherein the control information message comprises scheduling information indicating one or more scheduled sTTI for the one or more scheduled sTTI transmissions, respectively, and/or an indication of a timing for the one or more scheduled sTTIs for the one or more scheduled sTTI transmissions and/or an indication of a DMRS configuration for the one or more scheduled sTTIs for the one or more scheduled sTTI transmissions; and a transmitting/receiving module (34) operable to transmit and/or receive the one or more sTTI transmissions in accordance with the control information message.

Embodiment 25

A computer program comprising instructions which, when executed on at least one processor, cause the at least one processor to carry out the method according to embodiment 21.

Embodiment 26

A carrier containing the computer program of embodiment 25, wherein the carrier is one of an electronic signal, an optical signal, a radio signal, or a computer readable storage medium.

The following acronyms are used throughout this disclosure.

| | | | |
|---|---|---|---|
| 3GPP | Third Generation Partnership Project | eNB | Enhanced or Evolved Node B |
| 5G | Fifth Generation | ePDCCH | enhanced Physical Downlink Control Channel |
| ASIC | Application Specific Integrated Circuit | | |
| BLER | Block Error Rate | FDD | Frequency Division Duplexing |
| CP | Cyclic Prefix | FPGA | Field Programmable Gate Array |
| CPU | Central Processing Unit | gNB | New Radio Base Station |
| CRC | Cyclic Redundancy Check | HARQ | Hybrid Automatic Repeat Request |
| C-RNTI | Cell Radio Network Temporary Identifier | HTTP | Hypertext Transfer Protocol |
| CRS | Cell Specific Reference Signal | ID | Identifier |
| CSI | Channel State Information | LTE | Long Term Evolution |
| CSI-RS | Channel State Information Reference Signals | LTE-A | Long Term Evolution Advanced |
| | | MCS | Modulation and Coding Scheme |
| DCI | Downlink Control Information | MME | Mobility Management Entity |
| DMRS | Demodulation Reference Signal | ms | Millisecond |
| DSP | Digital Signal Processor | MTC | Machine Type Communication |
| NDI | New Data Indicator | SCEF | Service Capability Exposure Function |
| OFDM | Orthogonal Frequency Division Multiplexing | | |
| | | SC-FDMA | Single Carrier-Frequency Division Multiple Access |
| PCFICH | Physical Control Format Indicator Channel | | |
| | | SC-OFDM | Single Carrier-Orthogonal Frequency Division Multiplexing |
| PDCCH | Physical Downlink Control Channel | | |
| PDSCH | Physical Downlink Shared Channel | SI-RNTI | System Information Radio Network Temporary Identifier |
| P-GW | Packet Data Network Gateway | | |
| PMI | Precoding Matrix Indicator | sPDCCH | Short Physical Downlink Control Channel |
| PRB | Physical Resource Block | | |
| PUCCH | Physical Uplink Control Channel | sPDSCH | Short Physical Downlink Shared Channel |
| PUSCH | Physical Uplink Shared Channel | sPUSCH | Short Physical Uplink Shared Channel |
| RAT | Radio Access Technology | SRS | Sounding Reference Signal |
| RB | Resource Block | sTTI | Short Transmission Time Interval |
| RE | Resource Element | TCP | Transmission Control Protocol |
| RNTI | Radio Network Temporary Identifier | TDD | Time Division Duplexing |
| RRC | Radio Resource Control | TS | Technical Specification |
| RV | Redundancy Version | TTI | Transmission Time Interval |
| sDCI | Short Downlink Control Information | UE | User Equipment |

Those skilled in the art will recognize improvements and modifications to the embodiments of the present disclosure. All such improvements and modifications are considered within the scope of the concepts disclosed herein.

The invention claimed is:

1. A method of operation of a network node of a wireless communication network for scheduling multiple short Transmission Time Interval, sTTI, transmissions, comprising:
   transmitting a control information message to a wireless device for two or more sTTI transmissions;
   when the scheduling is to be performed in downlink, the control information message comprises downlink scheduling information indicating two or more scheduled downlink sTTIs for the two or more sTTI transmissions, the downlink scheduling information including an indication of a timing for the two or more scheduled sTTIs for the two or more sTTI transmissions and a bit field that indicates a number of scheduled sTTIs, wherein a plurality of possible combinations of two or more sTTI transmissions are predefined, and the bit field together with an index of a downlink sTTI transmission containing the control information message explicitly indicates one of the plurality of possible combinations of two or more sTTI transmissions as a selected combination of sTTIs for the two or more sTTI transmissions; and
   when the scheduling is to be performed in uplink, the control information message comprises uplink scheduling information indicating two or more scheduled uplink sTTIs for the two or more sITI transmissions, the uplink scheduling information including at least one of: an indication of a timing for the two or more scheduled sTTIs for the two or more sTTI transmissions, and an indication of a Demodulation Reference Signal, DMRS, configuration for the two or more scheduled sTTIs for the two or more sTTI transmissions.

2. The method of claim 1 wherein the two or more scheduled sTTIs are consecutive in the time domain.

3. The method of claim 1 wherein the control information message is transmitted on a physical downlink control channel.

4. The method of claim 1 wherein the control information message is transmitted on a short physical downlink control channel used for scheduling sTTI transmissions.

5. The method of claim 4 wherein a short physical downlink control channel is transmitted in each downlink sTTI transmission, except for a legacy control region.

6. The method of claim 1 wherein the control information message is transmitted on either a physical downlink control channel or a short physical downlink control channel used for scheduling both uplink and downlink sTTI transmissions.

7. The method of claim 1 wherein the two or more scheduled sTTIs are determined by a fixed scheduling timing and the bit field of the control information message that indicates the number of scheduled sTTIs.

8. The method of claim 1 wherein the control information message is comprised in a physical downlink control channel for a Transmission Time Interval, TTI, that comprises a plurality of sTTIs.

9. The method of claim 1 wherein a Demodulation Reference Signal, DMRS, configuration for each of the plurality of possible combinations of two or more sTTI transmissions is preconfigured.

10. The method of claim 9 wherein the DRMS configuration comprises a number of DMRS symbols and/or DMRS symbol positions for the two or more scheduled sTTIs.

11. The method of claim 1 wherein the control information message comprises a second bit field that indicates a Demodulation Reference Signal, DMRS, configuration for the two or more sTTI transmissions.

12. The method of claim 1 wherein the control information message comprises a second bit field that, together with the number of scheduled sTTIs, indicates a Demodulation Reference Signal, DMRS, configuration for the two or more sTTI transmissions.

13. The method of claim 1 wherein the control information message comprises a first bit field that indicates a number of scheduled sTTIs and a second bit field that indicates a timing of at least a first scheduled sTTI of the two or more scheduled sTTIs, and the two or more scheduled sTTIs are determined by the first bit field of the control information message that indicates the number of scheduled sTTIs and the second bit field of the control information message that indicates the timing of at least the first scheduled sTTI.

14. The method of claim 1 wherein the downlink scheduling information is slot-based multi-sTTI scheduling information that schedules all sTTIs in one or more slots as the two or more scheduled sTTIs.

15. The method of claim 14 wherein transmission of the control information message is limited to physical downlink control channel.

16. The method of claim 14 wherein transmission of the control information message is limited to physical downlink control channel and a first sTTI in a second slot of a subframe.

17. The method of claim 1 wherein a Demodulation Reference Signal, DMRS, configuration, including both a number of DMRS symbols and DMRS symbol positions, is preconfigured or configured by signaling, for each of a plurality of possible combinations of two or more scheduled sTTIs.

18. The method of claim 1 wherein a Demodulation Reference Signal, DMRS, configuration for the two or more scheduled sTTIs, including both a number of DMRS symbols and DMRS symbol positions, is determined by a separate bit field of the control information message.

19. A network node for a wireless communication network for scheduling multiple short Transmission Time Interval, sTTI, transmissions, comprising:
at least one processor; and
memory storing instructions executable by the at least one processor wherein the network node is configured to perform a method comprising:
transmitting a control information message to a wireless device for two or more sTTI transmissions;
when the scheduling is to be performed in downlink, the control information message comprises downlink scheduling information indicating two or more scheduled downlink sTTIs for the two or more sTTI transmissions, the downlink scheduling information including an indication of a timing for the two or more scheduled sTTIs for the two or more sTTI transmissions and a bit field that indicates a number of scheduled sTTIs, wherein a plurality of possible combinations of two or more sTTI transmissions are predefined, and the bit field together with an index of a downlink sTTI transmission containing the control information message explicitly indicates one of the plurality of possible combinations of two or more sTTI transmissions as a selected combination of sTTIs for the two or more sTTI transmissions; and
when the scheduling is to be performed in uplink, the control information message comprises uplink scheduling information indicating two or more scheduled uplink sTTIs for the two or more sTTI transmissions the uplink scheduling information including at least one of: an indication of a timing for the two or more scheduled sTTIs for the two or more sTTI transmissions: and an indication of a Demodulation Reference Signal, DMRS, configuration for the two or more scheduled sTTIs for the two or more sTTI transmissions.

20. A non-transitory computer readable medium storing computer program instructions which, when executed on at least one processor, cause the at least one processor to carry out a method comprising:
transmitting a control information message to a wireless device for two or more sTTI transmissions;
when the scheduling is to be performed in downlink, the control information message comprises downlink scheduling information indicating two or more scheduled downlink sTTIs for the two or more sTTI transmissions, the downlink scheduling information including an indication of a timing for the two or more scheduled sTTIs for the two or more sTTI transmissions and a bit field that indicates a number of scheduled sTTIs, wherein a plurality of possible combinations of two or more sTTI transmissions are predefined, and the bit field together with an index of a downlink sTTI transmission containing the control information message explicitly indicates one of the plurality of possible combinations of two or more sTTI transmissions as a selected combination of sTTIs for the two or more sTTI transmissions; and when the scheduling is to be performed in uplink, the control information message comprises uplink scheduling information indicating two or more scheduled uplink sTTIs for the two or more sTTI transmissions the uplink scheduling information including at least one of: an indication of a timing for the two or more scheduled sTTIs for the two or more sTTI transmissions, and an indication of a Demodulation Reference Signal, DMRS, configuration for the two or more scheduled sTTIs for the two or more sTTI transmissions.

21. A method of operation of a wireless device in a wireless communication network, comprising:

receiving, from a network node, a control information message for two or more short Transmission Time Interval, sTTI, transmissions;

determining if the received control information message comprises at least one of uplink scheduling information and downlink scheduling information;

determining that the received control information message comprises downlink scheduling information, wherein the downlink scheduling information indicating two or more scheduled downlink sTTIs for the two or more sTTI transmissions, the downlink scheduling information including an indication of a timing for the two or more scheduled sTTIs for the two or more sTTI transmissions and a bit field that indicates a number of scheduled sTTIs, wherein a plurality of possible combinations of two or more sTTI transmissions are predefined, and the bit field together with an index of a downlink sTTI transmission containing the control information message explicitly indicates one of the plurality of possible combinations of two or more sTTI transmissions as a selected combination of sTTIs for the two or more sTTI transmissions; and determining that the received control information message comprises uplink scheduling information, wherein the uplink scheduling information indicating two or more scheduled uplink sTTIs for the two or more sTTI transmissions the uplink scheduling information including at least one of: an indication of a timing for the two or more scheduled sTTIs for the two or more sTTI transmissions, and an indication of a Demodulation Reference Signal, DMRS, configuration for the two or more scheduled sTTIs for the two or more sTTI transmissions; and either one or both of transmitting and receiving the two or more sTTI transmissions in accordance with the control information message.

22. A wireless device for a wireless communication network, comprising:

at least one transceiver; and circuitry associated with the at least one transceiver, the circuitry configured to:

receive, from a network node via the at least one transceiver, a control information message for two or more short Transmission Time Interval, sTTI, transmissions;

when the received control information message comprises downlink scheduling information, the downlink scheduling information indicates two or more scheduled downlink sTTIs for the two or more sTTI transmissions, the downlink scheduling information including an indication of a timing for the two or more scheduled sTTIs for the two or more sTTI transmissions and a bit field that indicates a number of scheduled sTTIs, wherein a plurality of possible combinations of two or more sTTI transmissions are predefined, and the bit field indicates one of the plurality of possible combinations; and when the received control information message comprises uplink scheduling information, the uplink scheduling information indicates two or more scheduled uplink sTTI for the two or more sTTI transmissions the uplink scheduling information including at least one of: an indication of a timing for the two or more scheduled sTTIs for the two or more sTTI transmissions, and an indication of a Demodulation Reference Signal, DMRS, configuration for the two or more scheduled sTTIs for the two or more sTTI transmissions; and either one or both of transmit and receive, via the at least one transceiver, the two or more sTTI transmissions in accordance with the control information message.

23. A non-transitory computer readable medium storing computer program instructions which, when executed on at least one processor, cause the at least one processor to carry out a method comprising:

receiving, from a network node, a control information message for two or more short Transmission Time Interval, sTTI, transmissions transmissions;

when the received control information message comprises downlink scheduling information, the downlink scheduling information indicates two or more scheduled downlink sTTIs for the two or more sTTI transmissions, the downlink scheduling information including an indication of a timing for the two or more scheduled sTTIs for the two or more sTTI transmissions and a bit field that indicates a number of scheduled sTTIs, wherein a plurality of possible combinations of two or more sTTI transmissions are predefined, and the bit field together with an index of a downlink sTTI transmission containing the control information message explicitly indicates one of the plurality of possible combinations of two or more sTTI transmissions as a selected combination of sTTIs for the two or more sTTI transmissions; and when the received control information message comprises uplink scheduling information, the uplink scheduling information indicates two or more scheduled uplink sTTIs for the two or more sTTI transmissions the uplink scheduling information including at least one of: an indication of a timing for the two or more scheduled sTTIs for the two or more sTTI transmissions, and an indication of a Demodulation Reference Signal, DMRS, configuration for the two or more scheduled sTTIs for the two or more sTTI transmissions; and either one or both of transmitting and receiving the two or more sTTI transmissions in accordance with the control information message.

* * * * *

UNITED STATES PATENT AND TRADEMARK OFFICE
CERTIFICATE OF CORRECTION

PATENT NO. : 11,412,539 B2
APPLICATION NO. : 16/495723
DATED : August 9, 2022
INVENTOR(S) : Li et al.

It is certified that error appears in the above-identified patent and that said Letters Patent is hereby corrected as shown below:

On the Title Page

In Item (72), under "Inventors", in Column 1, Line 4, delete "Dusseldorf (DE);" and insert -- Düsseldorf (DE); --, therefor.

In Item (56), under "OTHER PUBLICATIONS", in Column 2, Line 3, delete "pages,." and insert -- pages. --, therefor.

In Item (57), under "ABSTRACT", in Column 2, Line 2, delete "short Transmission Time Internal (sTTI)" and insert -- short Transmission Time Interval (sTTI) --, therefor.

On Page 2, in Item (56), under "OTHER PUBLICATIONS", in Column 2, Line 3, delete "GPP" and insert -- 3GPP --, therefor.

On Page 2, in Item (56), under "OTHER PUBLICATIONS", in Column 2, Line 26, delete "U.S.A ," and insert -- U.S.A, --, therefor.

On Page 2, in Item (56), under "OTHER PUBLICATIONS", in Column 2, Line 30, delete "WG2 #97," and insert -- WG2 Meeting #97, --, therefor.

On Page 2, in Item (56), under "OTHER PUBLICATIONS", in Column 2, Line 33, delete "WG2 #97," and insert -- WG2 Meeting #97, --, therefor.

In the Specification

In Column 1, Line 8, delete "US provisional" and insert -- U.S. provisional --, therefor.

In Column 1, Line 23, delete "(Ms)" and insert -- (ms) --, therefor.

Signed and Sealed this
Fourth Day of April, 2023

*Katherine Kelly Vidal*
Katherine Kelly Vidal
*Director of the United States Patent and Trademark Office*

CERTIFICATE OF CORRECTION (continued)

In Column 3, Line 17, delete "⌈log$_2$(N$_{RB}^{DL}$(N$_{RB}^{DL}$+1)/2)" and insert -- ⌈log$_2$(N$_{RB}^{DL}$(N$_{RB}^{DL}$+1)/2)⌉ --, therefor.

In Column 5, Line 24, delete "SC-FMDA" and insert -- SC-FDMA --, therefor.

In Column 5, Line 25, delete "SC-FMDA" and insert -- SC-FDMA --, therefor.

In Column 5, Line 52, delete "to denote" and insert -- denote --, therefor.

In Column 5, Line 67, delete "short Transmit Time Internal (sTTI)" and insert -- short Transmission Time Interval (sTTI) --, therefor.

In Column 6, Line 67, delete "DRMS" and insert -- DMRS --, therefor.

In Column 8, Line 24, delete "DRMS" and insert -- DMRS --, therefor.

In Column 12, Lines 5-6, delete "from in both" and insert -- from both --, therefor.

In Column 16, Line 6, delete "n+k+$\Delta_I$," and insert -- n+k+$\Delta$I, --, therefor.

In Column 17, Line 3, delete "$\Delta_I$" and insert -- $\Delta$I --, therefor.

In Column 17, Line 65, delete "format" and insert -- format. --, therefor.

In the Claims

In Column 24, Line 65, in Claim 1, delete "sITI" and insert -- sTTI --, therefor.

In Column 25, Line 35, in Claim 10, delete "DRMS" and insert -- DMRS --, therefor.

In Column 28, Line 31, in Claim 23, delete "transmissions transmissions;" and insert -- transmissions; --, therefor.